(12) United States Patent
Crawford

(10) Patent No.: US 8,260,725 B2
(45) Date of Patent: Sep. 4, 2012

(54) METHOD OF CONDUCTING OPERATIONS FOR A SOCIAL NETWORK APPLICATION INCLUDING NOTIFICATION LIST GENERATION WITH OFFER HYPERLINKS ACCORDING TO NOTIFICATION RULES

(76) Inventor: C. S. Lee Crawford, Irving, TX (US)

( * ) Notice: Subject to any disclaimer, the term of this patent is extended or adjusted under 35 U.S.C. 154(b) by 0 days.

(21) Appl. No.: 12/967,040

(22) Filed: Dec. 13, 2010

(65) Prior Publication Data

US 2011/0196926 A1    Aug. 11, 2011

Related U.S. Application Data

(63) Continuation-in-part of application No. 12/463,168, filed on May 8, 2009, which is a continuation of application No. PCT/US2007/083987, filed on Nov. 7, 2007, and a continuation-in-part of application No. 12/767,785, filed on Apr. 26, 2010, which is a continuation-in-part of application No. 11/747,286, filed on May 11, 2007, now abandoned, which is a continuation-in-part of application No. 11/623,832, filed on Jan. 17, 2007, now abandoned, which is a continuation-in-part of application No. 11/559,438, filed on Nov. 14, 2006, now abandoned.

(60) Provisional application No. 60/736,252, filed on Nov. 14, 2005, provisional application No. 60/864,807, filed on Nov. 8, 2006, provisional application No. 60/759,303, filed on Jan. 17, 2006, provisional application No. 60/773,852, filed on Feb. 16, 2006.

(51) Int. Cl.
*G06Q 99/00* (2006.01)
*G06F 15/16* (2006.01)

(52) U.S. Cl. .................................... 705/319; 709/203
(58) Field of Classification Search .................. None
See application file for complete search history.

(56) References Cited

U.S. PATENT DOCUMENTS

| | | | |
|---|---|---|---|
| 2005/0171799 A1* | 8/2005 | Hull et al. | 705/1 |
| 2005/0216300 A1* | 9/2005 | Appelman et al. | 705/1 |

* cited by examiner

*Primary Examiner* — Pierre Vital
*Assistant Examiner* — Berhanu Mitiku

(57) ABSTRACT

In one embodiment, a method of conducting operations for a social network application, comprises: generating a notification list of recent activities of users of the social network application, wherein the notification list includes (1) at least one activity within the social network application of a first user and (2) at least one hyperlink to an offer involving an activity that is directly related to at least one activity of the first user, wherein an account of the first user defines at least one notification rule for controlling visibility of the at least one activity to other users of the social network application; and providing the notification list to a second user, that is a friend of the first user within the social network application, according to the at least one notification rule of the first user.

1 Claim, 21 Drawing Sheets

FIGURE 7

SUBSCRIBER # 123456789

ACTIVITY PROFILE

| | AVG. TIME PER DAY (STD. DEVIATION) | | | | | | | AVG. PER WEEK (STD. DEVIATION) | AVG. PER MONTH (STD. DEVIATION) |
|---|---|---|---|---|---|---|---|---|---|
| | S | M | T | W | T | F | S | | |
| ACTIVITY #1 | V1(s1) | V2(s2) | V3(s3) | V4(s4) | V5(s5) | V6(s6) | V7(s7) | V8(s8) | V9(s9) |
| SUBACTIVITY | V'1(s'1) | V'2(s'2) | V'3(s'3) | V'4(s'4) | V'5(s'5) | V'6(s'6) | V'7(s'7) | V'8(s'8) | V'9(s'9) |
| SUBACTIVITY | V''1(s''1) | V''2(s''2) | V''3(s''3) | V''4(s''4) | V''5(s''5) | V''6(s''6) | V''7(s''7) | V''8(s''8) | V''9(s''9) |
| ACTIVITY #N | N1(M1) | N2(M2) | N3(M3) | N4(M4) | N5(M5) | N6(M6) | N7(M7) | N8(8) | N9(M9) |
| SUBACTIVITY | N'1(M'1) | N'2(M'2) | N'3(M'3) | N'4(M'4) | N'5(M'5) | N'6(M'6) | N'7(M'7) | N'8(M'8) | N'9(M'9) |
| SUBACTIVITY | N''1(M''1) | N''2(M''2) | N''3(M''3) | N''4(M''4) | N''5(M''5) | N''6(M''6) | N''7(M''7) | N''8(M''8) | N''9(M''9) |

SUBSCRIBER # 123456789

|  | S | M | T | W | T | F | S | PER WEEK | PER MONTH |
|---|---|---|---|---|---|---|---|---|---|
| TOTAL TIME SPENT SHOPPING | X1(x1) | X2(x2) | X3(x3) | X4(x4) | X5(x5) | X6(x6) | X7(x7) | X8(x8) | X9(x9) |
| SHOPPING FREQUENCY | F1(f1) | F2(f2) | F3(f3) | F4(f4) | F5(f5) | F6(f6) | F7(f7) | F8(f8) | F9(f9) |

TIME PER SHOPPING TRIP

| TOTAL | T1(t1) | T2(t2) | T3(t3) | T4(t4) | T5(t5) | T6(t6) | T7(t7) | T8(t8) | T9(t9) |

TIME SPENT SHOPPING BY LOCATION

LOCATION 1:
TIME AT LOCATION: L1(l1) L2(l2) L3(l3) L4(l4) L5(l5) L6(l6) L7(l7) L8(l8) L9(l9)
OF STORES AT LOCATION: SL1(sl1) SL2(sl2) SL3(sl3) SL4(sl4) SL5(sl5) SL6(Sl6) SL7(sl7) SL8(sl8) SL9(sl9)

. . .

LOCATION #Z:
TIME AT LOCATION: LZ1(lz1) LZ2(lz2) LZ3(lz3) LZ4(lz4) LZ5(lz5) LZ6(lz6) LZ7(lz7) LZ8(lz8) LZ9(z9)
OF STORES AT LOCATION: SLZ(slz1) SLZ2(slz2) SLZ3(slz3) SLZ4(slz4) SLZ5(slz5) SLZ6(slz6) SLZ7(slz7) SLZ8(slz8) SLZ9(sz9)

SUBSCRIBER # 123456789

TIME SPENT SHOPPING BY MERCHANTS

| | S | M | T | W | T | F | S | PER WEEK | PER MONTH |
|---|---|---|---|---|---|---|---|---|---|
| MERCHANT 1: | TM1-1 | TM1-2 | TM1-3 | TM1-4 | TM1-5 | TM1-6 | TM1-7 | TM1-8 | TM1-9 |
| | sTM1-1 | sTM1-2 | sTM1-3 | sTM1-4 | sTM1-5 | sTM1-6 | sTM1-7 | sTM1-8 | sTM1-9 |
| SUB-STORE DEPT./TYPE 1 | | | | | | | | | |
| | TM1-S1-1 | TM1-S1-2 | TM1-S1-3 | TM1-S1-4 | TM1-S1-5 | TM1-S1-6 | TM1-S1-7 | TM1-S1-8 | TM1-S1-9 |
| | sTM1-S1-1 | sTM1-S1-2 | sTM1-S1-3 | sTM1-S1-4 | sTM1-S1-5 | sTM1-S1-6 | sTM1-S1-7 | sTM1-S1-8 | sTM1-S1-9 |
| ... | | | | | | | | | |
| SUB-STORE DEPT./TYPE Y | | | | | | | | | |
| | TM1-SY-1 | TM1-SY-2 | TM1-SY-3 | TM1-SY-4 | TM1-SY-5 TMY-SY-6 | TM1-SY-6 | TM1-SY-7 | TM1-SY-8 | TM1-SY-9 |
| | sTM1-SY-1 | sTM1-SY-2 | sTM1-SY-3 | sTM1-SY-4 | sTM1-SY-5 sTMY-SY-6 | sTM1-SY-6 | sTM1-SY-7 | sTM1-SY-8 | sTM1-SY-9 |
| ... | | | | | | | | | |
| MERCHANT X: | TMX-1 | TMX-2 | TMX-3 | TMX-4 | TMX-5 | TMX-6 | TMX-7 | TMX-8 | TMX-9 |
| | sTMX-1 | sTMX-2 | sTMX-3 | sTMX-4 | sTMX-5 | sTMX-6 | sTMX-7 | sTMX-8 | sTMX-9 |
| SUB-STORE DEPT./TYPE 1 | | | | | | | | | |
| | TMX-S1-1 | TMX-S1-2 | TMX-S1-3 | TMX-S1-4 | TMX-S1-5 | TMX-S1-6 | TMX-S1-7 | TMX-S1-8 | TMX-S1-9 |
| | sTMX-S1-1 | sTMX-S1-2 | sTMX-S1-3 | sTMX-S1-4 | sTMX-S1-5 | sTMX-S1-6 | sTMX-S1-7 | sTMX-S1-8 | sTMX-S1-9 |
| ... | | | | | | | | | |
| SUB-STORE DEPT./TYPE Y | | | | | | | | | |
| | TMX-SY-1 | TMX-SY-2 | TMX-SY-3 | TMX-SY-4 | TMY-SY-5 | TMX-SY-6 | TMX-SY-7 | TM1-SY-8 | TM1-SY-9 |
| | sTM1-SY-1 | sTM1-SY-2 | sTM1-SY-3 | sTM1-SY-4 | sTMY-SY-5 | sTM1-SY-6 | sTM1-SY-7 | sTM1-SY-8 | sTM1-SY-9 |

SUBSCRIBER # 123456789

PURCHASES

|  | S | M | T | W | T | F | S | PER WEEK | PER MONTH |
|---|---|---|---|---|---|---|---|---|---|
| PER TRIP: | | | | | | | | | |
| # OF PURCHASES: | NP1-1 sNP1-1 | NP1-2 sNP1-2 | NP1-3 sNP1-3 | NP1-4 sNP1-4 | NP1-5 sNP1-5 | NP1-6 sNP1-6 | NP1-7 sNP1-7 | NP1-8 sNP1-8 | NP1-9 sNP1-9 |
| $ OF PURCHASES: | DP1-1 sDP1-1 | DP1-2 sDP1-2 | DP1-3 sDP1-3 | DP1-4 sDP1-4 | DP1-5 sDP1-5 | DP1-6 sDP1-6 | DP1-7 sDP1-7 | DP1-8 sDP1-8 | DP1-9 sDP1-9 |
| PER LOCATION: | | | | | | | | | |
| LOCATION 1 | | | | | | | | | |
| # OF PURCHASES: | NP-L1-1 sNP-L1-1 | NP-L1-2 sNP-L1-2 | NP-L1-3 sNP-L1-3 | NP-L1-4 sNP-L1-4 | NP-L1-5 sNP-L1-5 | NP-L1-6 sNP-L1-6 | NP-L1-7 sNP-L1-7 | NP-L1-8 sNP-L1-8 | NP-L1-9 sNP-L1-9 |
| $ OF PURCHASES: | DP-L1-1 sDP-L1-1 | DP-L1-2 sDP-L1-2 | DP-L1-3 sDP-L1-3 | DP-L1-4 sDP-L1-4 | DP-L1-5 sDP-L1-5 | DP-L1-6 sDP-L1-6 | DP-L1-7 sDP-L1-7 | DP-L1-8 sDP-L1-8 | DP-L1-9 sDP-L1-9 |
| . . . | | | | | | | | | |
| LOCATION N | | | | | | | | | |
| # OF PURCHASES: | NP-LN-1 sNP-LN-1 | NP-LN-2 sNP-LN-2 | NP-LN-3 sNP-LN-3 | NP-LN-4 sNP-LN-4 | NP-LN-5 sNP-LN-5 | NP-LN-6 sNP-LN-6 | NP-LN-7 sNP-LN-7 | NP-LN-8 sNP-LN-8 | NP-LN-9 sNP-LN-9 |
| $ OF PURCHASES: | DP-LN-1 sDP-LN-1 | DP-LN-2 sDP-LN-2 | DP-LN-3 sDP-LN-3 | DP-LN-4 sDP-LN-4 | DP-LN-5 sDP-LN-5 | DP-LN-6 sDP-LN-6 | DP-LN-7 sDP-LN-7 | DP-LN-8 sDP-LN-8 | DP-LN-9 sDP-LN-9 |

SUBSCRIBER # 123456789

PURCHASES

| | S | M | T | W | T | F | S | PER WEEK | PER MONTH |
|---|---|---|---|---|---|---|---|---|---|
| MERCHANT TYPE 1 | | | | | | | | | |
| # OF PURCHASES: | NP-MT1-1 | NP-MT1-2 | NP-MT1-3 | NP-MT1-4 | NP-MT1-5 | NP-MT1-6 | NP-MT1-7 | NP-MT1-8 | NP-MT1-9 |
| | sNP-MT1-1 | sNP-MT1-2 | sNP-MT1-3 | sNP-MT1-4 | sNP-MT1-5 | sNP-MT1-6 | sNP-MT1-7 | sNP-MT1-8 | sNP-MT1-9 |
| $ OF PURCHASES: | DP-MT1-1 | DP-MT1-2 | DP-MT1-3 | DP-MT1-4 | DP-MT1-5 | DP-MT1-6 | DP-MT1-7 | DP-MT1-8 | DP-MT1-9 |
| | sDP-MT1-1 | sDP-MT1-2 | sDP-MT1-3 | sDP-MT1-4 | sDP-MT1-5 | sDP-MT1-6 | sDP-MT1-7 | sDP-MT1-8 | sDP-MT1-9 |
| . . . | | | | | | | | | |
| MERCHANT TYPE N | | | | | | | | | |
| # OF PURCHASES: | NP-MTN-1 | NP-MTN-2 | NP-MTN-3 | NP-MTN-4 | NP-MTN-5 | NP-MTN-6 | NP-MTN-7 | NP-MTN-8 | NP-MTN-9 |
| | sNP-MTN-1 | sNP-MTN-2 | sNP-MTN-3 | sNP-MTN-4 | sNP-MTN-5 | sNP-MTN-6 | sNP-MTN-7 | sNP-MTN-8 | sNP-MTN-9 |
| $ OF PURCHASES: | DP-MTN-1 | DP-MTN-2 | DP-MTN-3 | DP-MTN-4 | DP-MTN-5 | DP-MTN-6 | DP-MTN-7 | DP-MTN-8 | DP-MTN-9 |
| | sDP-MTN-1 | sDP-MTN-2 | sDP-MTN-3 | sDP-MTN-4 | sDP-MTN-5 | sDP-MTN-6 | sDP-MTN-7 | sDP-MTN-8 | sDP-MTN-9 |

FIGURE 14

SUBSCRIBER # 123456789

PURCHASES

| | S | M | T | W | T | F | S | PER WEEK | PER MONTH |
|---|---|---|---|---|---|---|---|---|---|
| MERCHANT 1 | | | | | | | | | |
| # OF PURCHASES: | NP-M1-1 | NP-M1-2 | NP-M1-3 | NP-M1-4 | NP-M1-5 | NP-M1-6 | NP-M1-7 | NP-M1-8 | NP-M1-9 |
| | sNP-M1-1 | sNP-M1-2 | sNP-M1-3 | sNP-M1-4 | sNP-M1-5 | sNP-M1-6 | sNP-M1-7 | sNP-M1-8 | sNP-M1-9 |
| $ OF PURCHASES: | DP-M1-1 | DP-M1-2 | DP-M1-3 | DP-M1-4 | DP-M1-5 | DP-M1-6 | DP-M1-7 | DP-M1-8 | DP-M1-9 |
| | sDP-M1-1 | sDP-M1-2 | sDP-M1-3 | sDP-M1-4 | sDP-M1-5 | sDP-M1-6 | sDP-M1-7 | sDP-M1-8 | sDP-M1-9 |
| ... | | | | | | | | | |
| MERCHANT N | | | | | | | | | |
| # OF PURCHASES: | NP-MN-1 | NP-MN-2 | NP-MN-3 | NP-MN-4 | NP-MN-5 | NP-MN-6 | NP-MN-7 | NP-MN-8 | NP-MN-9 |
| | sNP-MN-1 | sNP-MN-2 | sNP-MN-3 | sNP-MN-4 | sNP-MN-5 | sNP-MN-6 | sNP-MN-7 | sNP-MN-8 | sNP-MN-9 |
| $ OF PURCHASES: | DP-MN-1 | DP-MN-2 | DP-MN-3 | DP-MN-4 | DP-MN-5 | DP-MN-6 | DP-MN-7 | DP-MN-8 | DP-MN-9 |
| | sDP-MN-1 | sDP-MN-2 | sDP-MN-3 | sDP-MN-4 | sDP-MN-5 | sDP-MN-6 | sDP-MN-7 | sDP-MN-8 | sDP-MN-9 |

1400

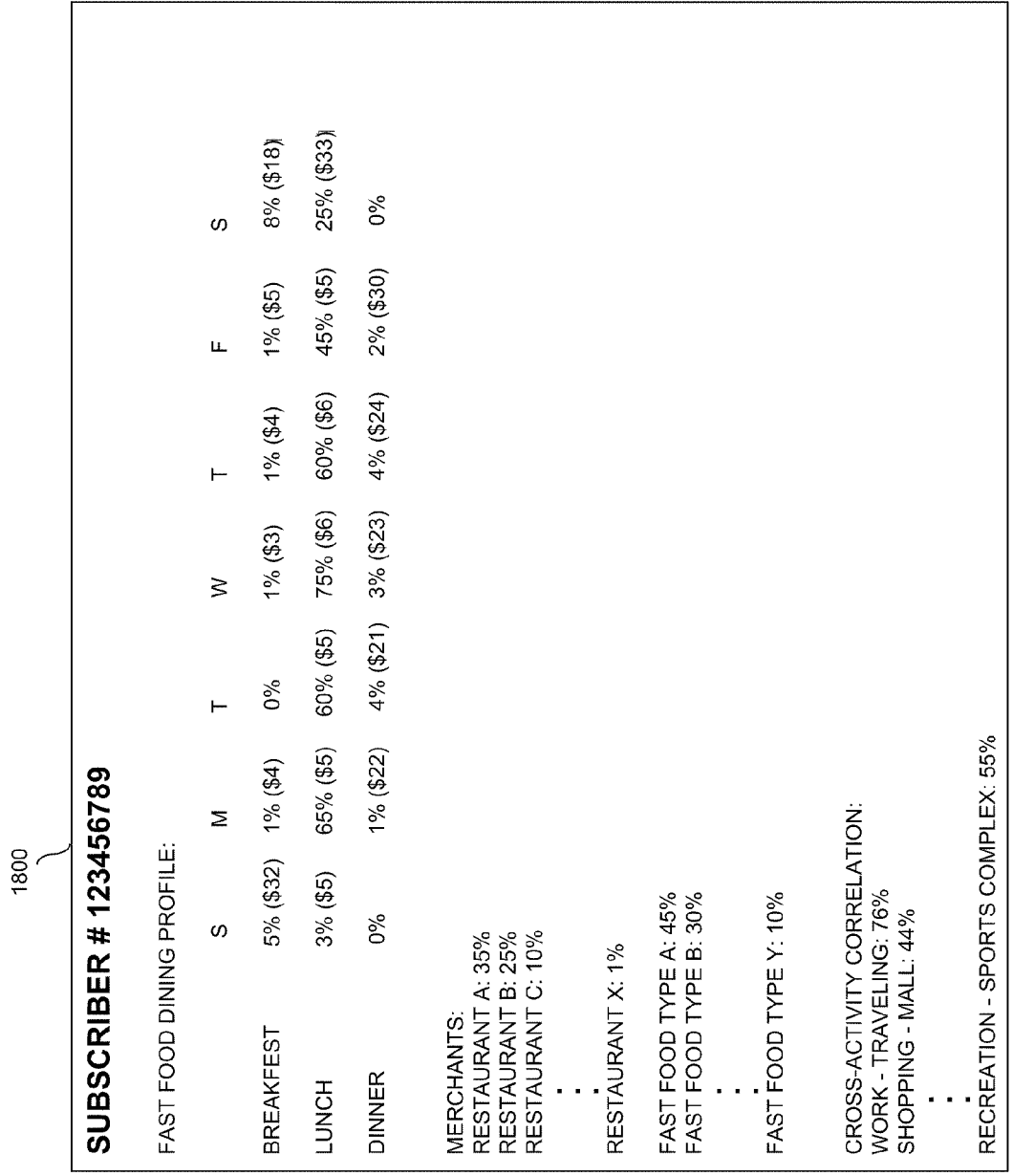

METHOD OF CONDUCTING OPERATIONS FOR A SOCIAL NETWORK APPLICATION INCLUDING NOTIFICATION LIST GENERATION WITH OFFER HYPERLINKS ACCORDING TO NOTIFICATION RULES

RELATED APPLICATIONS

This application (1) is a continuation-in-part of U.S. patent application Ser. No. 12/463,168, May 8, 2009, which is a continuation of PCT application number PCT/US2007/083987, filed 7 Nov. 2007 (published as WO 2008/082794 A2) which claims priority to (i) U.S. patent application Ser. No. 11/559,438, filed 14 Nov. 2006; (ii) U.S. patent application Ser. No. 11/623,832, filed 17 Jan. 2007; (iii) U.S. Provisional Patent Application Ser. No. 60/864,807, filed 8 Nov. 2006; and (iv) U.S. Provisional Patent Application Ser. No. 60/917,638, filed 11 MAY 2007 and (2) is a continuation-in-part of Ser. No. 12/767,785, filed Apr. 26, 2010 which is a continuation-in-part U.S. patent application Ser. No. 11/747,286, filed May 11, 2007 now abandoned, which is a continuation-in-part of U.S. patent application Ser. No. 11/623,832, filed Jan. 17, 2007 now abandoned, which is a continuation-in-part of U.S. patent application Ser. No. 11/559,438, filed Nov. 14, 2006 now abandoned (which claims the benefit of U.S. Provisional Application Ser. No. 60/736,252, filed Nov. 14, 2005, U.S. Provisional Patent Application Ser. No. 60/759,303, filed Jan. 17, 2006 and U.S. Provisional Patent Application Ser. No. 60/773,852, filed Feb. 16, 2006); U.S. patent application Ser. No. 11/623,832 also claims the benefit of U.S. Provisional Patent Application Ser. No. 60/759,303, filed Jan. 17, 2006 and U.S. Provisional Patent Application Ser. No. 60/773,852, filed Feb. 16, 2006. All of the preceding applications are incorporated herein by reference.

BACKGROUND

Location based services refer generally to services that provide information to a user in relation to the location of the user. Many prior location based services are relatively pedestrian in nature and provide relatively simple information. An example of a known location based service is a "weather" service in which the user's zip code is provided to the service (e.g., through a conventional HTML webpage, a WAP or other cellular phone interface, etc.) through a network and the service responds by communicating the current weather conditions and the forecast for several days. Other known location based services provide "social" applications such as allowing users to determine each other's locations, receive notification when a friend comes within a predetermined distance, and similar operations. Another type of location based services are generally referred to as "McDonalds finders" that provide search results in a map form (e.g., searching for specific locations of restaurants/stores within a given distance of the user). Other location based services have proposed delivering various types of "advertising" (e.g., when a user arrives at an airport, various ads can be delivered to the user's cellular phone). However, many such prior advertising location based services are quite simplistic and do not possess any appreciable intelligence for selecting advertisements beyond the location of the user.

SUMMARY

In one embodiment, a method of conducting operations for a social network application, comprises: generating a notification list of recent activities of users of the social network application, wherein the notification list includes (1) at least one activity within the social network application of a first user and (2) at least one hyperlink to an offer involving an activity that is directly related to at least one activity of the first user, wherein an account of the first user defines at least one notification rule for controlling visibility of the at least one activity to other users of the social network application; and providing the notification list to a second user, that is a friend of the first user within the social network application, according to the at least one notification rule of the first user.

In one embodiment, a method of providing a location based service (LBS), comprises: (i) receiving location information over a period of time by one or more software programs from a plurality of wireless devices belonging to a plurality of subscribers; (ii) processing the location information to detect that respective subscribers tend to spend time at one or more locations with one or more other specific subscribers; (iii) storing data indicative of a tendency of each such subscriber to spend time with the subscriber's one or more other specific subscribers; (iv) detecting whether subscribers are present at locations with one or more specific subscribers identified in the stored data subsequent to performance of (ii) and (iii); and (v) comparing ad parameters against subscriber data, to select ads for communication to subscribers, wherein the comparing differentiates in selection of ads for communication to subscribers in response to (iv).

In another embodiment, the activities identified in the logs are defined in a hierarchical manner. In another embodiment, the logs identify when an activity has been completed. In another embodiment, the logs indicate completion of financial transactions with merchants.

In one embodiment, the server for LBS services comprises: one or multiple databases storing information identifying subscribers of one or several LBS or other applications, wherein the one or multiple databases identifies groups of subscribers that have been detected to be located in close physical proximity on multiple occasions; one or multiple databases for storing advertisements to subscribers; code for determining whether subscribers are currently clustering based upon location information pertaining to subscribers; and code for selecting and communicating advertisements to subscribers based on locations of the subscribers, wherein the code for selecting and communicating determines selects ads for subscribers depending upon whether subscribers have been determined to be clustering.

In another embodiment, a method comprises the operations performed by the one or more first programs, by the one or more second programs, and/or the LBS applications.

In another embodiment, a method of providing a location based service (LBS), comprises: receiving location information by one or more software programs from a plurality of wireless devices belonging to a plurality of subscribers of one or more location based services; processing the location information, by one or more software programs, to identify activity of subscribers at merchant locations; maintaining a respective profile, by one or more software programs, for each of the plurality of subscribers that reflects norm shopping activity for the respective subscriber; comparing information pertaining to current or recent shopping activity, by one or more software programs, for each subscriber of the plurality of subscribers against information stored in the profile of the respective subscriber; selecting ads, by one or more software programs, for each subscriber of the plurality of subscribers in relation to the comparing; and communicating, by one or more software programs, the selected ads to plurality of wireless devices belonging to the plurality of subscribers.

The selects ads can be communicate to wireless devices while the plurality subscribers are conducting current shopping activity. In another embodiment, each profile comprises one or more activity norm parameters for a plurality of merchant types.

In another embodiment, each shopping behavior profile stores information related to a number of purchases typically conducted by the respective subscriber, wherein the selecting compares a number of recent purchases made by the respective subscriber against information stored in the respective subscriber's shopping behavior profile to select ads for communication to the respective subscriber.

The foregoing has outlined rather broadly certain features and/or technical advantages in order that the detailed description that follows may be better understood. Additional features and/or advantages will be described hereinafter which form the subject of the claims. It should be appreciated by those skilled in the art that the conception and specific embodiment disclosed may be readily utilized as a basis for modifying or designing other structures for carrying out the same purposes. It should also be realized by those skilled in the art that such equivalent constructions do not depart from the spirit and scope of the appended claims. The novel features, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the appended claims.

BRIEF DESCRIPTION OF THE DRAWINGS

FIGS. 7-14 depict activity norm summary information that can be compiled or calculated for use in selecting ads to communicate to subscribers according to some representative embodiments.

FIGS. 18 and 19 depict activity norm profiles and for different merchant types according to some representative embodiments.

DETAILED DESCRIPTION

Some representative embodiments are directed to systems and methods for monitoring data associated with users of location based services and directing advertisements to the users. Some representative embodiments are directed to distribution of mobile applications. Some representative embodiments are directed to generating, processing, and/or using behavioral analytics. Some representative embodiments are directed to communicating ads for presentation to mobile devices and/or static processor based systems. Some representative embodiments are directed to social network applications.

Figure 1:
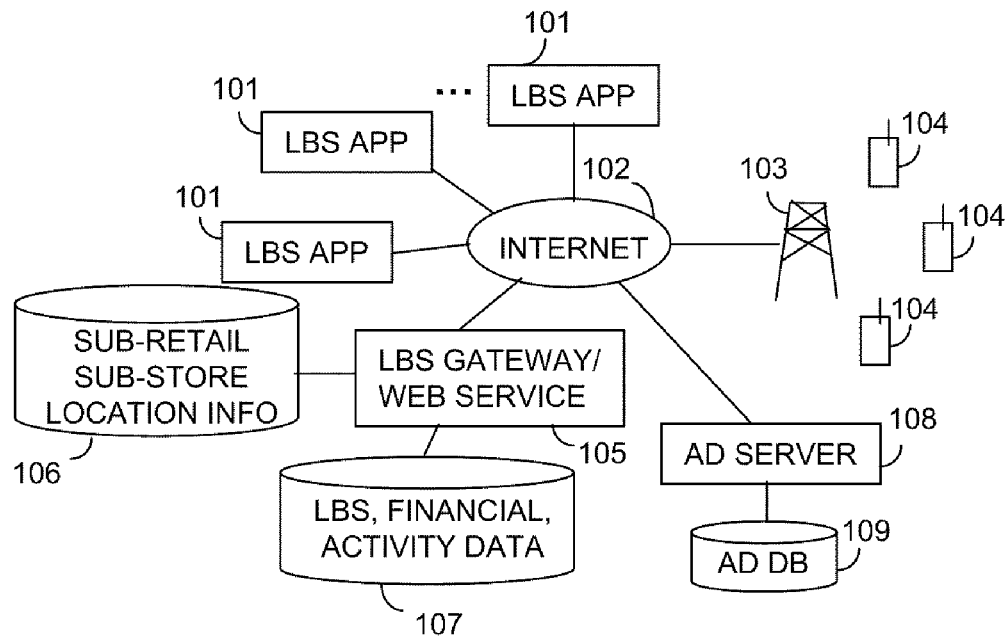
FIG. 1 depicts a system in which multiple LBS applications and other applications provide location based services to multiple subscribers and in which advertisements can be directed to the multiple subscribers using multiple types of information according to one representative embodiment.

Referring now to the drawings, FIG. 1 depicts a system in which multiple LBS applications and other application servers 101 (referred to herein as "applications" for convenience depending upon context) are provided for communication with multiple subscriber devices 104 and in which advertisements can be directed to the multiple subscribers 104 using multiple types of information. Applications 101 may include one or more social network application such as the social network applications described in APPENDIX B of PCT Publication WO 2008/082794 A2. Applications 101 may include one or more search applications such as the search applications described in APPENDIX C of PCT Publication WO 2008/082794 A2.

As shown in FIG. 1, there are preferably a plurality of applications 101 that provide location based services or other services to subscriber devices 104. Applications 101 can provide conventional location based services such as map/navigation services, weather services, local merchant search services, etc. Applications 101 can further include financial or shopping location based services as described in U.S. Provisional Patent Application No. 60/736,252, filed Nov. 14, 2005, 60/759,303, filed Jan. 17, 2006 and 60/773,852, filed Feb. 16, 2006, which are all incorporated herein by reference in their entirety. Applications 101 can include "social" applications or gaming applications that facilitate different types of subscriber interaction. LBS applications 101 may receive location information that is indicative of the current location of subscribers 104 and communicate LBS information to the subscribers 104 according to the location information either upon request by the subscribers 104 or automatically depending upon the nature/purpose of the particular LBS application 101. The application data is possibly communicated through Internet 102 and a wireless network 103 (e.g., a cellular network) to subscribers 104. The subscriber devices 104 can be any type of suitable wireless device (e.g., cellular phones, "smartphones," wireless e-mail devices, wireless capable PDAs, etc.) that possess the ability to determine their approximate current location or communicate through a network that enables the approximate location to be determined.

Applications 101 may also communicate with gateway/web service 105. In preferred embodiments, subscriber devices 104 communicate their current location to gateway/web service 105. Also, as subscriber devices 104 access various LBS applications 101, subscriber devices 104 communicate their activation of an LBS or other application to gateway/web service 105. Such location and device use data may be employed for the selection of ads for presentation to users of subscriber devices 104 as discussed herein. Gateway/web service 105 then may intermediate communication between the selected application(s) 101 and the respective subscriber devices 104. Thus, subscribers 104 may access multiple applications through the same source (or may coordinate selected communication through a common server or service). Also, subscribers 104 may only need to communicate their current location to the same destination which is then available to any application 101 as appropriate.

Although gateway/web service 105 provides such gateway services, the gateway services are not critical to all embodiments. In some embodiments, subscriber devices 104 and/or applications 101 can report to web service 105 (i) the current location of subscribers 104 to web service 105 as subscribers 104 utilize their respective applications and (ii) when a respective subscriber 104 accesses an application and ceases use of the application (if applicable).

Gateway/web service 105 updates and/or maintains a log of locations where subscribers 104 visited in DB 107. Also, gateway/web service 105 maintains a log of interaction with or access to particular LBS or other applications 101. Additionally, gateway/web service 105 may maintain a log of financial transactions completed by various subscribers as identified by financial applications 101 (e.g., a budget application, a fraud monitoring LBS application, etc.) and communicated to gateway/web service 105.

Gateway/web service 105 utilizes the location information, application interaction information, and/or financial information to infer the activities performed by the subscribers and the current activity being performed by the subscribers. The logs of activities for subscribers and current activities being performed are stored in DB 107. The logs of activities enable more accurate selection of ads, incentives, offers, etc. to be directed to subscribers as will be discussed below.

In some embodiments, the following activities and sub-activities are defined: (i) commuting; (ii) work; (iii) school; (iv) dining—(a) fast food; (b) casual; . . . fine dining; (v) entertainment— (a) movie; (b) music venue; . . . bar; (vi) sports/recreation— (a) health club; (b) golf; (c) athletic complex/fields; . . . gaming; (vii) shopping— (a) groceries; (b) gas; (c) clothing, shoes, accessories; (d) home decoration; (e) home improvement; . . . sports equipment; (viii) social; (ix) traveling/vacation, etc. Of course, these activities and sub-activities are by way of example and any other activities and/or sub-activities could be additionally or alternatively employed. Also, it shall be appreciated that the activities need not be mutually exclusive in that a single subscriber could be engaged in multiple activities at the same time. The information can be encoded in any suitable ontology. For example, a hierarchical classification of the types of locations could be formulated. In one embodiment, specific merchants are defined within the hierarchical framework within shopping related activities. An example branch in such a hierarchical framework could be RETAIL: shopping: big-box store: TARGET®: grocery section. In alternative embodiments, any such hierarchical descriptors assignable to locations that indicate the nature of the activity being undertaken by a subscriber may be employed. In some embodiments, many of the activities and sub-activities are related to activities at physical locations (e.g., specific locations, specific merchants, etc.).

In some embodiments, a current activity of a subscriber can be inferred from the type of application that the subscriber is accessing. For example, if a subscriber is utilizing a navigation LBS application and the subscriber has not reached their destination, it may be inferred that the subscriber is commuting. If a subscriber is utilizing a social application, certain activities (work, school, etc.) can be eliminated or considered less probably or relevant while other activities can possess a greater probability (e.g., dining, entertainment, etc.). Accordingly, when gateway/web service 105 attempts to infer the current activity of a subscriber, gateway/web service 105 identifies the applications that are currently active for the subscriber.

In some embodiments, gateway/web service 105 utilizes information in DB 106 to infer the activity of the user. In general, DB 106 correlates specific locations to one or several specific activities. For example, DB 106 can be constructed by "mapping" the addresses or coordinates of residential areas, retail districts, schools, health care facilities, sports/athletic facilities, etc. to the particular activities that are customary to those types of locations. Additionally, DB 106 includes information at several geospatial "resolution" levels. In some embodiments, DB 106 comprises geo-coordinates or other spatial information that define (i) various retail districts at a higher level, (ii) specific malls, strip-malls, stand-alone stores, etc. within a retail district, (iii) specific stores; and (iv) sub-store locations. In sub-store locations, the specific goods or specific service provided can be identified. By maintaining a log of the locations visited by a subscriber and the amount of time spent at the locations, the activities of a user can be estimated. Sub-store locations can be determined utilizing any number of mechanisms and/or algorithms. For example, a GPS receiver could be employed provided the GPS receiver possesses sufficient antenna gain and sufficient reception within the store. Alternatively, many retail locations utilize multiple WiFi access points. The particular ID's of the WiFi access points that are detectable and/or the relative signal strength of the WiFi access points can be utilized for an intra-store location determination. Also, sub-store locating functionality can be utilized to ascertain whether a subscriber has made a purchase at a particular merchant. For example, if a subscriber has spent an amount of time near a location where a cash-register is known to be present and the subscriber leaves the store after being at that location, it may be inferred that the subscriber has made a purchase at that store.

Financial information captured by financial related LBS applications 101 can be used to augment the identification of subscriber activities. In such financial related applications 101, the applications monitor user accounts for the completion of transactions (e.g., credit or debit card transactions). Using the merchant information (merchant ID, merchant name, merchant classification, etc.) in the transaction information, the activity can be more closely estimated. For example, if a user is located within a mall and the user previously purchased items at a clothing store, the specific current shopping activity can be inferred to include clothing shopping even though the user may temporarily depart from stores containing such items. Alternatively, transaction information may signal that a particular activity has been completed by the user. For example, if a user makes a purchase at a grocery store that is typical for their weekly grocery purchases, one can conclude that the user will not be conducting further significant grocery shopping for some amount of time.

Transaction information can be obtained using the systems disclosed in APPENDIX A of PCT Publication WO 2008/082794 A2.

As an example of a user log could be given by: 6:00 am-8:30 am: undefined; 8:30 am-9:00 am: banking; 9:15 am-10:20 am: grocery shopping; 12:15 pm-1:00 pm; dining (fast food); 1:30 pm-2:00 pm: commuting: 2:00 pm: begin shopping (clothing): clothing purchase made at 2:35 at young women's depart. of dept. store retailer. In some representative embodiments, logs can be reviewed by advertisers, although the specific identity of subscribers are preferably not reviewable. In alternative embodiments, the logs are not actually reviewable by advertisers. Instead, the logs are merely maintained in DB 107 and advertising parameters are compared against the information in the logs to direct advertisements.

By providing such a log of activities (previously performed and currently performed), a more intelligent selection of ads for communication to the subscriber can occur. For example, when the grocery shopping activity has been completed, selection of ads for specific grocery items will have relatively little value. Depending upon the purchasing behavior of the subscriber, it may be advantageous to send the subscriber clothing-related advertisements while the subscriber is clothing shopping (even after one or several purchases have been made). Alternatively, if the subscriber has already spent more than the subscriber usually spends as reflected t in the prior purchases, it may not be advantageous to send more clothing advertisements since the subscriber may have already spent their limit and is only currently "browsing," i.e. the probability of further purchases can be estimated as being low.

In some embodiments, activity norms and financial norms (e.g., selected behavioral analytics) are calculated by observing subscriber behavior over a period of time. For the purpose of this application, the term "norm" parameter refers to a parameter that is indicative of a general level or average for the particular subscriber. For example, for grocery shopping norms, the typical period between grocery shopping (e.g., in days), the typical day(s) for grocery shopping, the average amount spent, the range of amounts spent, the standard deviation of amounts spent, the type of stores in which grocery shopping occurs, etc. can be compiled from location information and financial information obtained by LBS applications. As another example, for clothing-type shopping norms, the typical day(s) for shopping, the average amount spent, the standard deviation of amounts spent, the number of transactions per shopping event, the average amount of time spent shopping at a particular retail location and/or per day, the types of stores visited, etc. can be compiled, the types of items purchases (if known), etc. can be compiled. Also, correlation between activities can be compiled. For example, it may be observed that a particular subscriber may routinely engage in a "dining (fast food)" activity after engaging in "recreation—sports complex" activity. Subscriber activity and/or financial norms are then compared against subscriber's more recent activities for the purpose of ad selection.

By compiling such information, intelligent selection of ads for subscribers may occur. In preferred embodiments, advertisers upload ads into ad DB 109 through ad server 108. Also, the advertisers specify any specific ad parameters for association with their various ads. The ad parameters are compared by ad server 108 against subscriber information and the activity information and norm information in DB 107. When the information in DB 107 satisfies the ad parameters for particular subscribers, the respective ad(s) are communicated to those subscribers by ad server 108. Any other ad selection criteria can be employed. For example, the ads of certain advertisers can be prioritized based upon purchased ad placements. The payment for placement of ads may include payments to prioritize ad placement according to any ad parameter discussed herein or in the APPENDICES of PCT Publication WO 2008/082794 A2. For example, payments for ad placements may occur according to purchasing norm parameters, clustering parameters, shopping timing parameters, etc. which are discussed below. The payments for ad placements may also utilize any such parameters in combination or in combination with other subscriber data. For example, an advertiser may pay for ad placements for subscribers that typically spend greater than $200 per shopping trip, shop at a specific type of retail establishment, and that fit a given demographic profile. All such combination of ad parameters are contemplated according to some representative embodiments.

Figure 2:
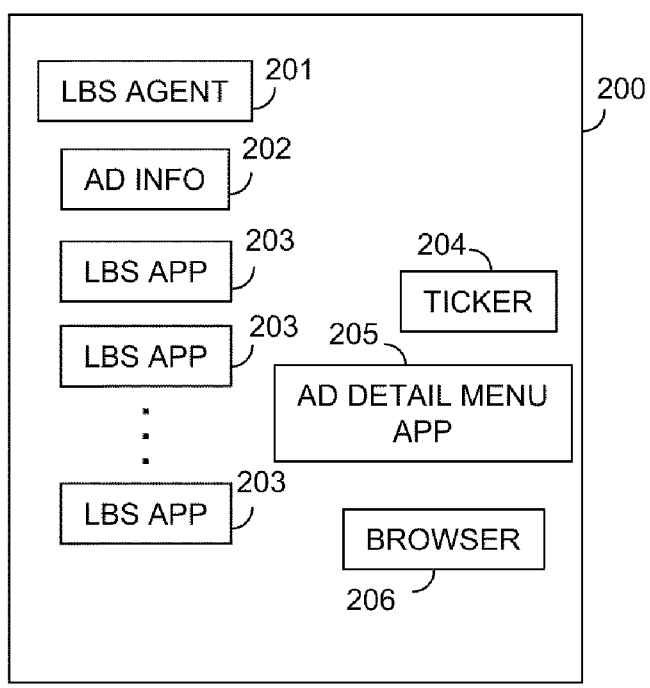
FIG. 2 depicts a block diagram of a subscriber device adapted for delivery of advertisements according to one representative embodiment.

Referring now to FIG. 2, subscriber device 200 is shown that is adapted for delivery of advertisements according to one representative embodiment. Subscriber device 200 can be any suitable wireless device, such as a cellular phone, that is capable of executing software instructions. The software instructions on subscriber device 200 preferably include multiple LBS or other mobile applications 203. The local applications 203 may contact remote LBS or other application servers 101 to deliver the application-based information to the subscriber. Subscriber device 200 further includes LBS agent 201. LBS agent 201 preferably manages or intermediates the communication of location LBS applications 203 with remote LBS applications 101 and/or gateway service 105. LBS agent 201 preferably forwards location information to the appropriate LBS applications 101 and/or gateway service 105 at times defined by the respective applications. Also, LBS agent 201 may receive messages from applications 101 and forwards the messages to the respective local applications 203. LBS agent 201 simplifies the implementation of LBS applications 203 and prevents conflict or difficulties in the execution of local LBS applications 203. Also, LBS agent 201 can manage updates to any LBS functionality that is common to all LBS applications 203 or one or several specific LBS applications 203.

Subscriber device 200 further comprises software for presenting ads to subscribers in an efficient manner. In one embodiment, subscriber device 200 comprises ticker software application 204 and ad detail menu application 205. In preferred embodiments, some ads are communicated to LBS agent 201 of subscriber device 200 using SMS messaging. The SMS messages preferably detail how the ad is to be presented to the subscriber. Preferably, the SMS messages detail whether the ad is to be placed into a ticker, for how long, and what particular text is to be displayed in the ticker. A ticker generally refers to a scrolling stream of characters on a screen of the wireless device (e.g., that mimics a "ticker-tape" in electronic form). LBS agent 201 provides the appropriate information to ticker software application 204 to display to the user when the user reviews the screen of subscriber device 200 (e.g., when the subscriber opens his/her phone). Also, the SMS messages preferably detail information to be placed in a menu type form that provides a more detailed presentation of ads for subscriber review. Also, should a subscriber desire to view additional detail for an ad or download a digital coupon, a hyperlink can be included for user selection that causes browser application 206 to download the corresponding content.

In some embodiments, "digital coupons" are communicated to subscriber devices 104 through the ad selection functionality of ad server 108 and ad DB 107. The digital coupons are preferably implemented by use of a digital image encoded according to a digital rights management (DRM) scheme.

The digital image can display the "coupon" details, such as product/store/location/purchase conditions, the amount of the coupon, etc. Also, the digital image preferably includes a "code" (e.g., an alphanumeric string) that authenticates the validity of the coupon. When a subscriber wishes to use a digital coupon, the user can present the screen of the subscriber device 104 displaying the digital coupon to a clerk of a merchant. A merchant that has previously agreed to accept such digital coupons can enter the code into the merchant's POS device during a transaction. The merchant's system can then determine the validity of the coupon in real-time by communicating the code to a suitable server. Upon determining the validity of the coupon, the merchant's POS device can suitably adjust the transaction total. Also, the merchant's system can use the code to obtain settlement of the coupon amount at a later appropriate time using the code.

The DRM functionality can be used for several purposes in the digital coupon process. In some embodiments, the DRM functionality ties the digital coupon to a specific subscriber device 104, i.e., the digital image is not decrypted by other subscriber devices. Also, in some embodiments, location information can be encoded within the DRM rules. For example, spatial coordinates and a radius distance can be defined such that the digital image is only decrypted by the DRM software when the user is within the area defined by the spatial coordinates and the radius distance (to ensure that the coupon is only presented at desired retail locations/merchants, etc.). That is, the DRM software accesses the current location of the subscriber device 104 and selectively decrypts the digital image by comparing the current location to the location rules defined in the DRM license associated with the digital coupon.

In some embodiments, a short "ad" of several seconds (e.g., a promotional video) is incorporated with a digital coupon. When a subscriber initially reviews the digital coupon, the promotional video is played. After the promotional video is played, the digital image containing the coupon information is then displayed. The DRM license can contain a DRM rule that causes the video to be deleted upon review for the purpose of minimizing the memory usage of the digital coupon over time.

Some representative embodiments can provide a number of advantages. For example, by maintaining a database of sub-locations within specific stores and the types of goods at those sub-locations, intelligent selection of ads for delivery to subscribers can occur. For example, in ordinary e-advertising and LBS advertising, it is most likely never useful to communicate an advertisement for an inexpensive, somewhat common-place food item. That is, the ad will have a very low probability of affecting the subscriber's purchasing activities. However, if it is known that a subscriber is standing in a particular grocery aisle of a "big-box" retailer that contains that type of food item according to representative embodiments, communication of such an ad may make economic sense because the probability of the ad being successful in affecting the purchasing behavior is much higher than if the ad were communicated when the subscriber is at another type of location.

Additionally, by providing a log of activities, selection of ads for subscribers can occur in a much more efficient and effective manner that possible according to conventional LBS applications. That is, subscriber activities provide a more reasoned basis for estimating the appropriateness of an ad for a subscriber than the mere current location of the subscriber. Also, by aggregating data over time and data from multiple sources, the activities of a subscriber can be more accurately inferred. Also, by compiling historical norms, the effectiveness of an advertisement in affecting immediate purchasing behavior can be more readily determined.

FIGS. 7-14 depict activity norm summary information 700, 800, 900, 1000, 1100, 1200, 1300, and 1400 that can be compiled or calculated for use in selecting ads to communicate to subscribers according to some representative embodiments.

FIG. 7 depicts activity summary profile 700 according to one representative embodiment. Activity summary profile 700 stores information that indicates the amount of time spent by a subscriber for a plurality of activities. Also, the information is provided in a hierarchical manner. Specifically, the amount of time is shown for various sub-activities. As shown in FIG. 7, for ACTIVITY 1, the average amounts of time spent for ACTIVITY 1 per day of the week (Sunday through Saturday) are represented by parameters V1-V7. The standard deviations for the amounts of time spent for ACTIVITY 1 per each day of the week are represented by parameters s1-s7. The average amounts of time spent per week and per month for ACTIVITY 1 are represented by parameters V8 and V9 and the standard deviations for time spent per week and per month are represented by s8 and s9. In a similar manner, average amounts of time and standard deviations are shown for SUBACTIVITIES, i.e., (V'1-V'9, s'1-s'9) for a first sub-level activity and (V"1-V"9, s"1-s"9) for a second sublevel activity. Any suitable number of subactivities and levels of subactivities could be so provided. As shown in FIG. 7, this type of information is repeated for a plurality of activities (through "ACTIVITY N").

Figure 8:
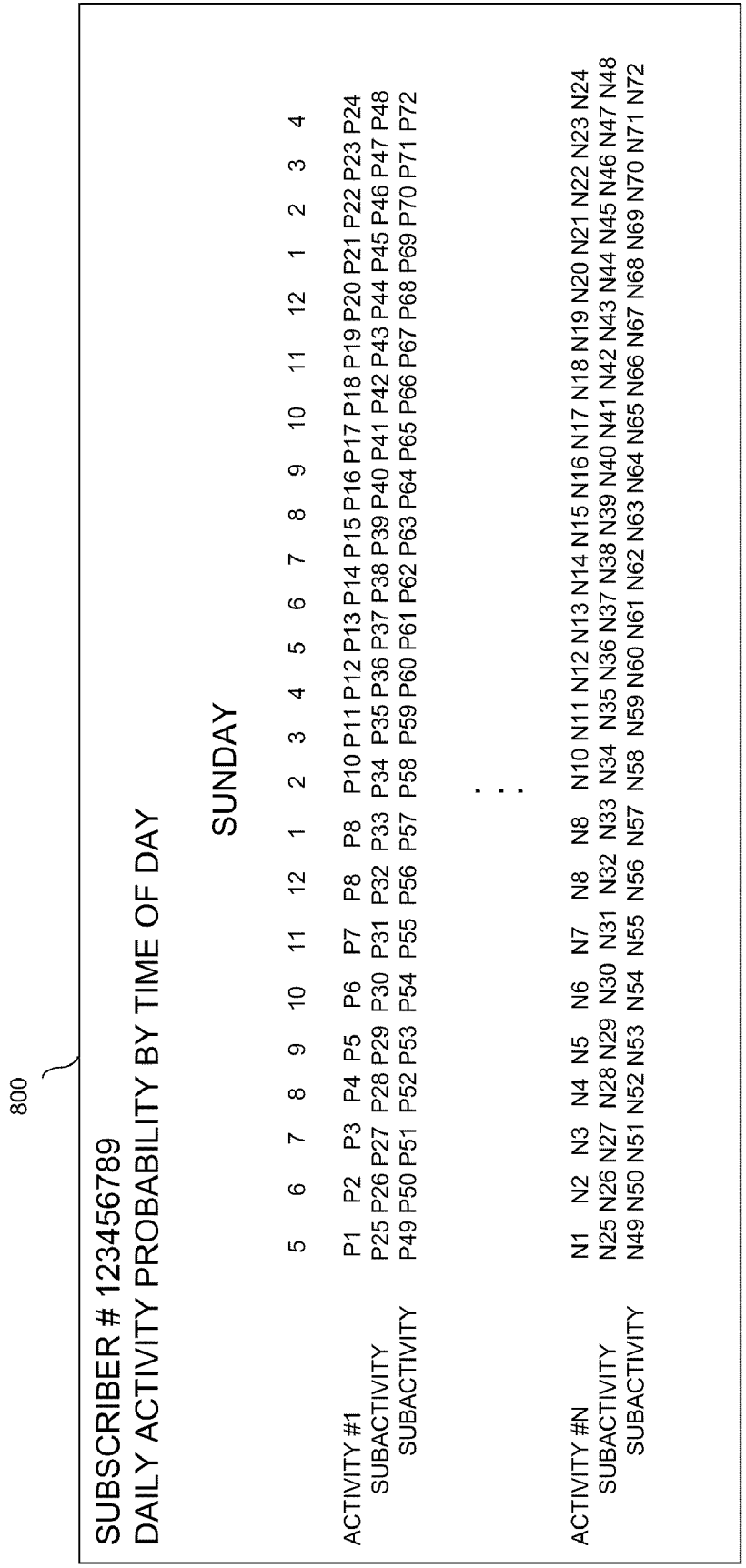

FIG. 8 depicts activity probability profile 800 according to one representative embodiment. Activity probability profile 800 is defined for one day of the week (i.e., Sunday). Preferably, similar profiles (not shown) are defined for other days of the week. Profile 800 defines the probability that a subscriber will engage in a particular activity within a given time frame. For example, the probability that the subscriber will engage in ACTIVITY 1 between 5 am and 6 am is defined by the parameter P1. Likewise, the probabilities for the other hours of the day for ACTIVITY 1 are defined by parameters P2-P24. Probabilities for hierarchical subactivities are shown in parameters P25-P48 and P49-P72. Probabilities are preferably defined for a plurality of activities through ACTIVITY N.

FIG. 9 depicts shopping activity profile 900 according to one representative embodiment. Profile 900 comprises relatively high level shopping summary information. Profile 900 comprises the average amounts of time spent shopping per each day of the week, per week, and per month in parameters X1-X9. The standard deviations for these times are shown in parameters x1-x9. The shopping frequencies for these time periods are represented by parameters F1-F9. The shopping frequency represents the average number of discrete shopping trips taken by the subscriber for the respective time period. The standard deviations for the shopping frequency for these periods are represented by parameters f1-f9. The average amounts of time per shopping trip are represented by parameters T1-T9 for these time periods with the standard deviations represented by parameters t1-t9.

The average amounts of time spent shopping per shopping location (e.g., MALL X, MALL Y, . . . MALL Z, etc.) is shown for a plurality of locations for these time periods. The locations are preferably retail locations in which there are multiple merchant stores in relatively close proximity such as a mall or retail district. For LOCATION 1, the average amounts of time for the various time periods are represented by parameters L1-L9 with the standard deviations represented by parameters l1-l9. Also, the average numbers of stores visited by retail location for the time periods for LOCATION 1 are represented by parameters SL1-SL9 with the standard deviations represented by parameters s11-s19. Similar parameters are defined for a plurality of locations (as shown through LOCATION Z).

Figure 10:
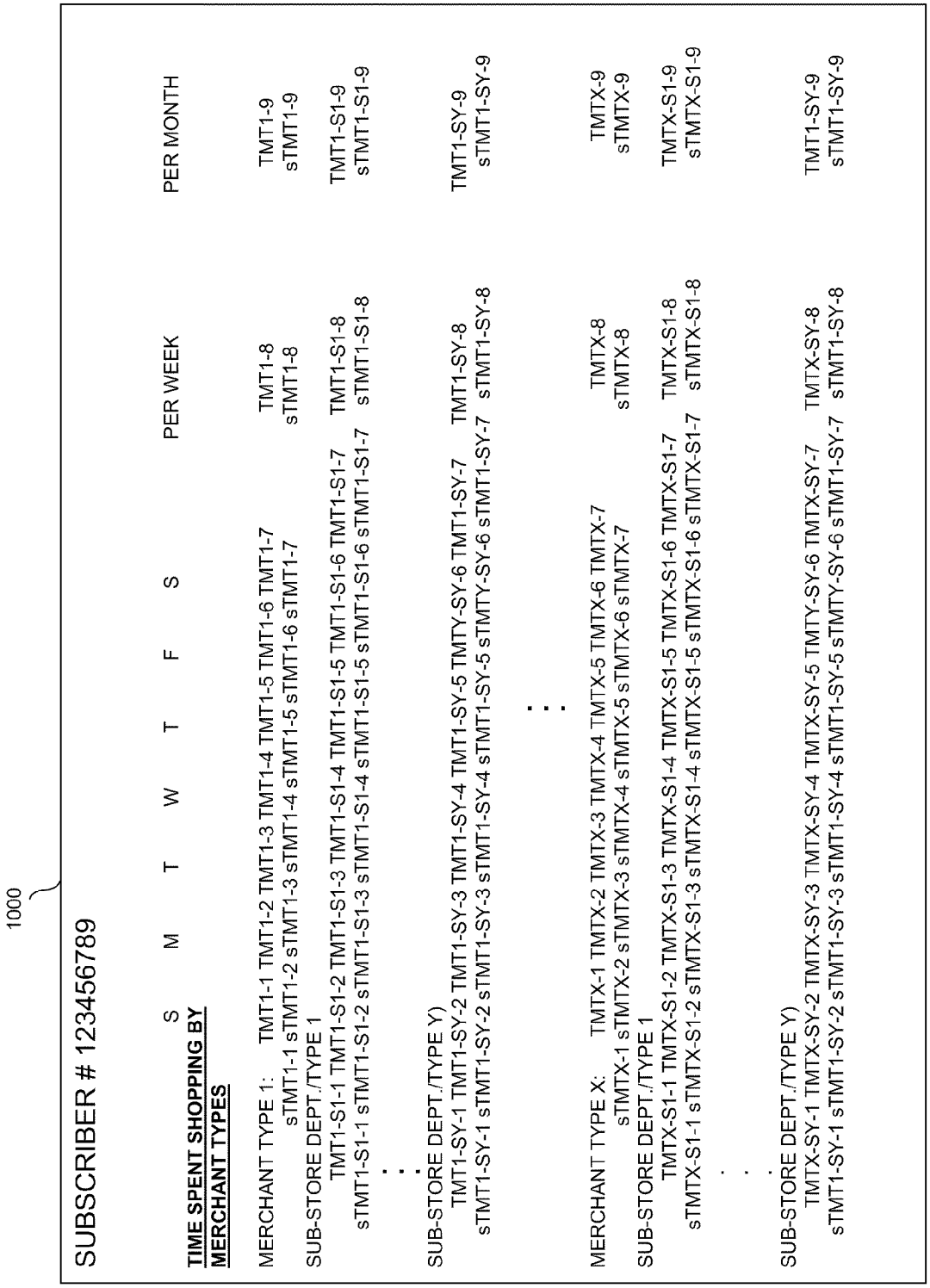

FIG. 10 depicts merchant type shopping profile 1000 according to one representative embodiment. Profile 1000 preferably stores average amounts of time spent shopping for a plurality of merchant types (e.g., clothing retailers, electronics retailers, bookstores, big-box retailers, grocery retailers, etc.). Also, the standard deviations are defined (denoted by the "s" prefix). The amounts of time and standard deviations are preferably calculated or compiled for each day of the week, per week, and per month time periods. Also, average amounts of time and standard deviations are defined for sub-store locations or departments for various merchant types. Such information is preferably compiled or calculated for a plurality of merchant types (shown as MERCHANT TYPE 1 through MERCHANT TYPE X). FIG. 11 depicts merchant shopping profile 1100 according to one representative embodiment. Profile 1100 stores the same type of information as profile 1000 except the information pertains to specific merchants as opposed to types of merchants.

When financial transactions are monitored and logged, shopping activity norms in terms of purchases are preferably compiled or calculated. FIG. 12 depicts shopping purchase profile 1200 according to one representative embodiment. Profile 1200 stores average numbers of purchases per shopping trip (parameters NP1-1 through NP1-9) and average amounts spent per shopping trip (parameters DP1-1 through DP1-9) for each day of the week, per week, and per month time frames. The standard deviations for these values are also given (parameters sNP1-1 through sNP1-9 and sDP1-1 through sDP1-9). Average numbers and amounts of purchases for locations are defined (LOCATION 1 through LOCATION N) as shown in parameters NP-L1-1 through NP-L1-9 . . . NP-LN-1 through NP-LN-9 and DP-L1-1 through DP-L1-9 . . . DP-LN-1 through DP-LN-9. Standard deviations are also defined for the locations for these time frames as shown in parameters sNP-L1-1 through sNP-L1-9 . . . sNP-LN-1 through sNP-LN-9 and sDP-L1-1 through sDP-L1-9 . . . sDP-LN-1 through sDP-LN-9. Merchant type purchase profile 1300 (FIG. 13) and merchant purchase profile 1400 (FIG. 14) depict similar purchase information (number of purchases, dollar amounts, standard deviations) by merchant types and specific merchants.

Figure 15:
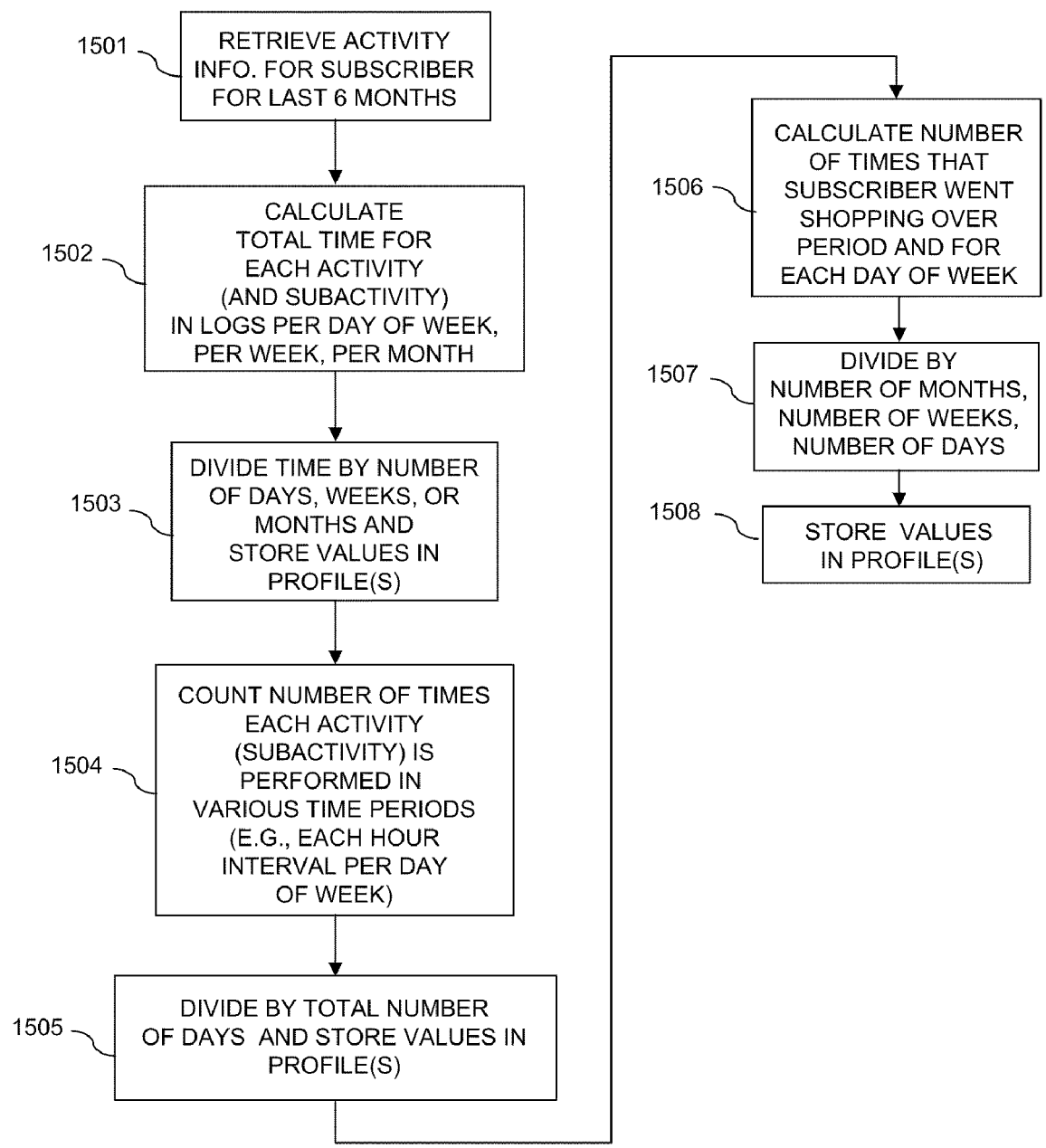
FIGS. 15-17 depict respective flowcharts for processing activity information and/or financial transaction information to generate respective norm parameters for storage in subscriber profiles according to some representative embodiments.

FIG. 15 depicts a flowchart for processing shopping activity information for a respective subscriber to generate profile information according to one representative embodiment. In 1501, activity information is retrieved for the last 6 months in a preferred embodiment (although any other suitable length of time could be selected). The activity information is preferably retrieved from pre-existing activity logs according to one embodiment. Alternatively, location based information could be retrieved and correlated to activities in conjunction with the norm building process. In 1502, total time is calculated for each activity (and subactivity) per day of week, per week, per month. In 1503, the total amounts of time are divided by the numbers of each of days of the week, the number of weeks, and the number of months for the selected period of time. The values are stored in one or more profile(s).

In 1504, the number of times that each activity (subactivity) was performed in various time periods (e.g., each hour interval per day of week) is calculated. In 1505, the numbers of times for each activity/subactivity are divided by the total numbers of each of the days of the week in the selected period of time and the resulting values are stored in one or more profile(s).

In 1506, the number of times that the subscriber went shopping over the selected period and for each day of week are calculated. In 1507, the calculated numbers of times are divided by the number of months, the number of weeks, and the number of days, respectively. The resulting values are stored in one or more profile(s).

Figure 16:
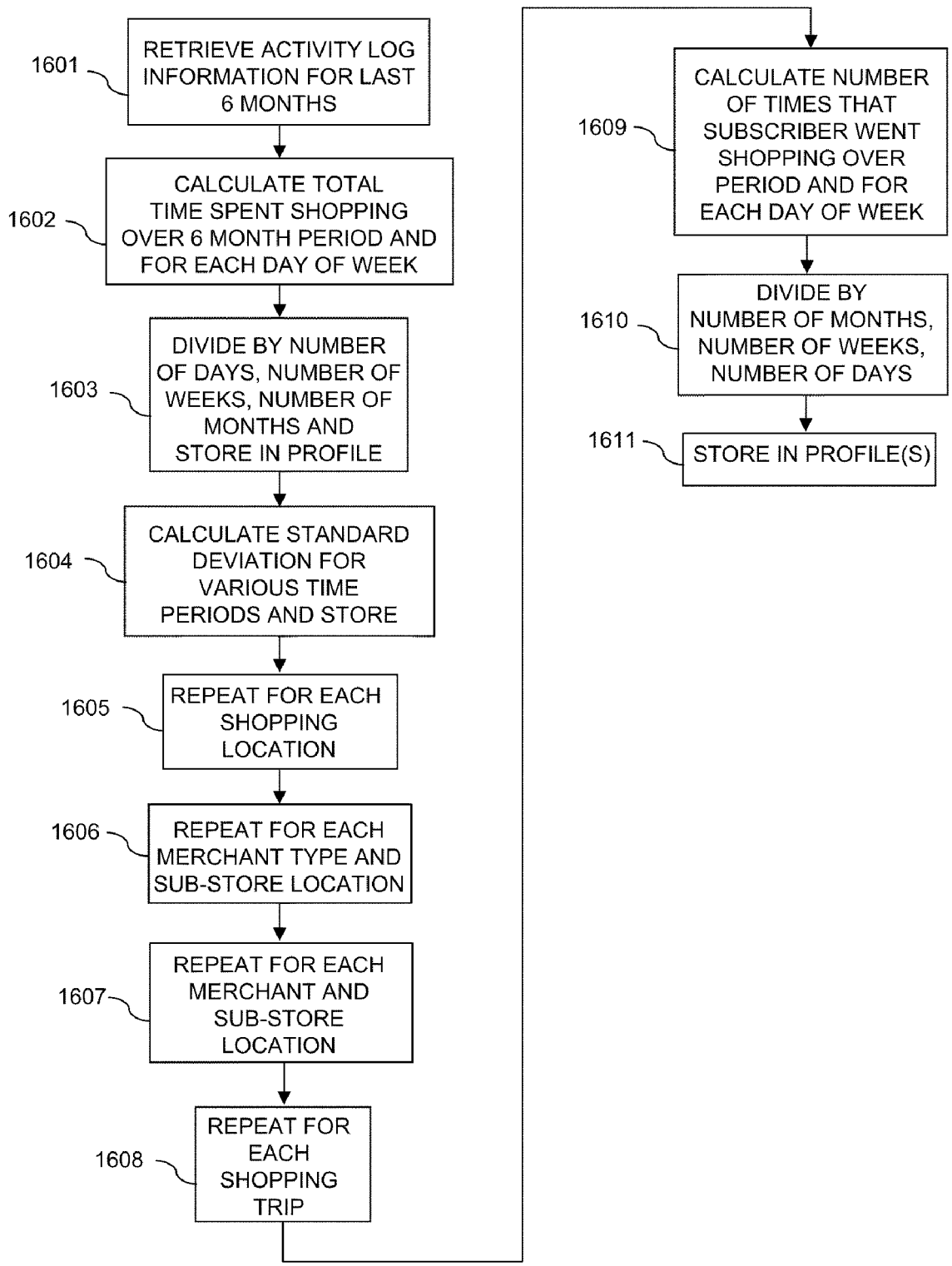

FIG. 16 depicts a flowchart for processing shopping activity information for a respective subscriber to generate profile information according to one representative embodiment. In 1601, activity log information is retrieved for last 6 months (or any other suitable period of time). In 1602, the total amount of time spent shopping over the selected period of time is calculated. Also, the total amount of time for the selected period for each day of the week is also calculated. In 1603, the calculated values are divided by the numbers of each day of the week, number of weeks, number of months in the selected period of time and the resulting values are stored in one or more profiles to generate the average amounts of time spent shopping per day of week, per week, and per month. In 1604, the standard deviations for the various time periods are calculated and stored in one or more profiles.

In 1605, the calculation of averages and standard deviations for the time is repeated for a plurality of shopping locations or respective retail locations in which multiple merchants are present. The calculated values are stored in one or more profile(s). In 1606, the calculation of averages and standard deviations are repeated for each merchant type and sub-store location. The calculated values are stored in one or more profile(s). In 1607, the calculation of averages and standard deviations are repeated for each merchant and sub-store location. The calculated values are stored in one or more profile(s).

In 1606, the calculation of averages and standard deviations is repeated for each discrete shopping trip. That is, an individual shopping trip refers to a period of time where a subscriber was substantially continuously engaged in a shopping activity. The average amounts of time spent shopping per shopping trip per each day of week, per week, and per month are calculated and the standard deviations are calculated.

In 1607, the numbers of times that the subscriber went shopping over the selected period and for each day of week over the selected period are calculated. In 1608, the calculated values are divided by the number of months, the number of weeks, the number of each day of the week in the selected period of time and the resulting values are stored in one or more store in one or more profiles.

Figure 17:
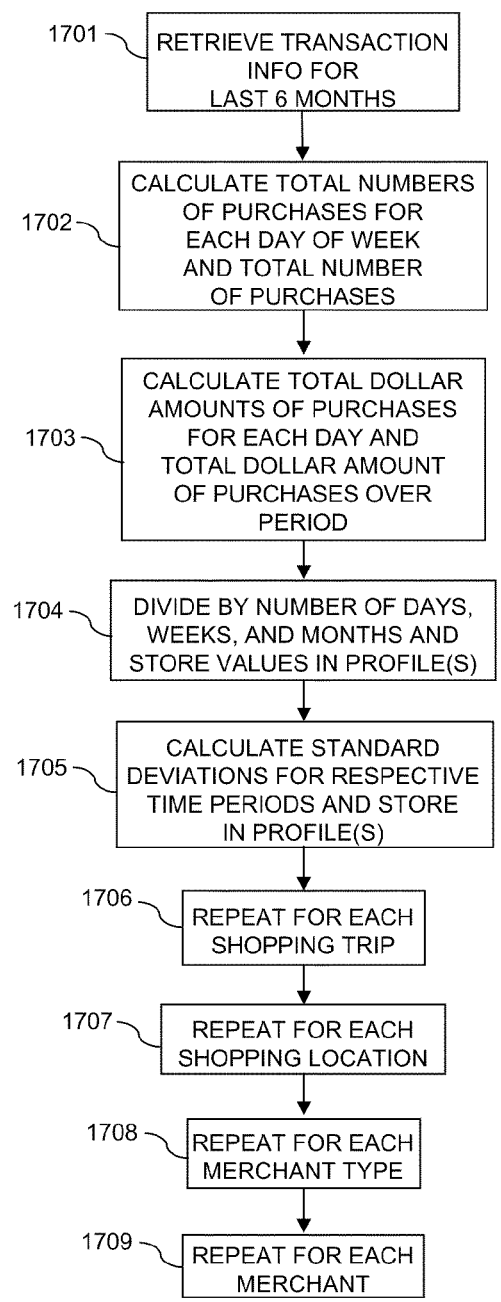

FIG. 17 depicts a flowchart for processing financial activity information for a respective subscriber to generate profile information according to one representative embodiment. In 1701, transaction information is retrieved for last 6 months or any other suitable period of time. In 1702, the total numbers of purchases for each day of week and total number of purchases are calculated. In 1703, the total dollar amounts of purchases are calculated for each day of the week and total dollar amount of purchases over the selected period of time are calculated. In 1704, the calculated values (from 1702 and 1703) are divided by the numbers of each day of the week, the number of weeks, and the number of months within the selected period to calculate the average values to be stored in the one or more profile(s). In 1705, the standard deviations for respective time periods are calculated and stored in one or more profiles.

In 1706, the calculations are repeated to calculate the averages and standard deviations for the various time periods for each shopping trip. The calculated values are stored in one or more profile(s). In 1707, the calculations are repeated for each shopping location. The calculated values are stored in one or more profile(s). In 1708, the calculations are repeated for each merchant type. In 1709, the calculations are repeated for each merchant. The calculated values are stored in one or more profile(s).

Figure 19:
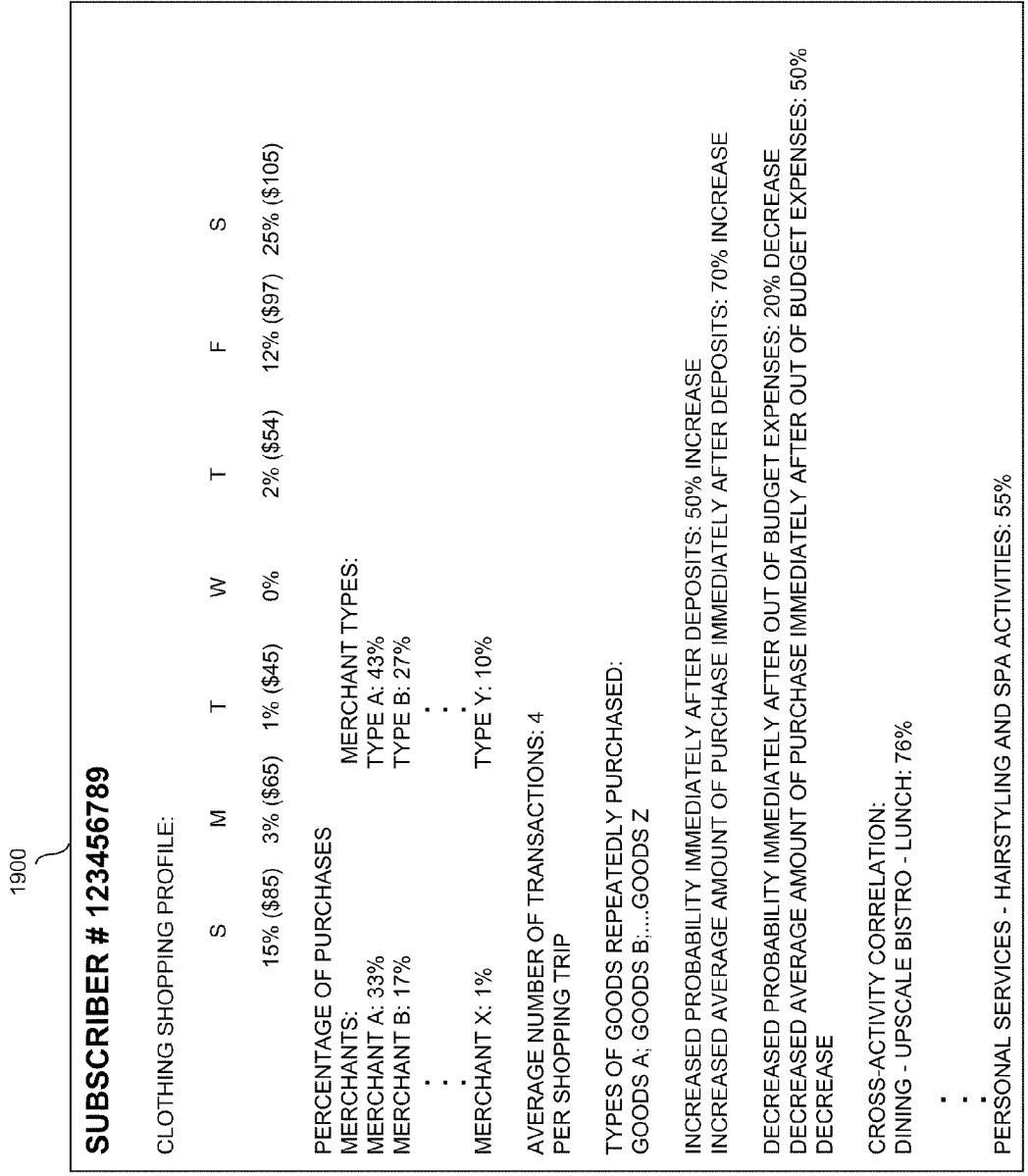

FIGS. 18 and 19 depict example activity norm profiles 1800 and 1900 for different types of merchants according to some representative embodiments. Norm profiles 1800 and 1900 are preferably compiled by monitoring activity information as determined using LBS data and financial information for the respective subscriber. Any number of similar profiles can be defined for other types of shopping or spending activities. Preferably, some profiles are created and maintained for each subscriber, although not every profile need be created and maintained for each subscriber as some subscribers may not sufficiently engage in the respective activity for the information to be useful.

Norm profile 1800 depicts activity norm data for "FAST FOOD DINING." Norm profile 1800 depicts the percentage of times that the subscriber engages in the activity at the respective times (by breakfast, lunch, and dinner) for each day of the week and the average amount spent at each respective time when the subscriber decides to engage in the activity. It may be observed that at certain times the subscriber dines with other parties, such as members of the subscriber's family, while at other times the subscriber dines alone (compare breakfast on Sunday with lunch on Wednesday). Profile 1800 further details percentages of purchases by restaurants and restaurants types. For example, profile 1800 indicates that the subscriber dines at restaurant A 35% of time when the subscriber decides to engage in fast food dining. Profile 1800 further indicates that the subscriber dines at a restaurant of type A 45% of the time when the subscriber decides to engage in fast food dining.

Norm profile 1800 preferably indicates other activities that are correlated to fast food dining. For example, norm profile 1800 indicates that when the subscriber is engaged in a "work—traveling" activity, the subscriber engages in fast food dining 76% of the time (during or shortly thereafter the work-traveling activity). Also, norm profile 1800 indicates that when the subscriber is or recently has engaging in a "shopping mall" activity, the subscriber engages in fast food dining 44% of the time (during or shortly thereafter the shopping mall activity). By providing such correlation information, specific ads can be directed to a subscriber at an appropriate time. Specifically, the ads might be able to reach the subscriber before the subscriber has made a decision to engage in a specific activity or to go to a specific merchant. That is, if only current location data is utilized, "fast food dining" ads might not be selected. Accordingly, the subscriber may make a decision to engage at a specific fast food restaurant before ads are ever communicated to the subscriber. Some embodiments potentially enable ads to be communicated to the subscriber at a relevant time but before the subscribers has made such a decision. Thereby, the "steering" ability of communicated ads according to some embodiments may be relatively high.

Norm profile 1900 is similar to norm profile 1800 except that norm profile 1900 includes norm parameters relevant to clothing shopping, clothing merchants, and clothing merchant types (e.g., young-women's retailer, designer retailer, discount retailer, etc.). Profile 1900 includes additional information. For example, norm profile 1900 preferably includes a parameter that indicates that the number of clothing-related purchases that the subscriber typically makes per shopping trip. Norm profile 1900 may also include information indicative of the typical goods or type of goods purchased by the subscriber (e.g., if the information is made available by the retailers in connection with coupon, discount, or payment settlement processes).

Profile 1900 also preferably includes information that relates a correlation between other financial considerations and the purchase of clothing. Profile 1900 indicates that there is an increased probability of 50% of clothing purchases immediately after deposits into a financial account of the subscriber (e.g., when a paycheck or other funds are deposited in the account). Also, there is an increase in the average amount of said purchases immediately after deposits of 70%. It is seen, for this subscriber, that clothing purchases are highly correlated to available funds and, accordingly, the selection of ads for this subscriber should also depend upon the deposit of funds into the subscribers account (e.g., in terms of timing of the deposits and the amounts of the deposits).

Profile 1900 indicates decreased probability of 20% immediately after out of budget expenses. Profile 1900 further indicates a decreased average amount of purchase immediately after out of budget expenses of 50%. In general, expenses may be categorized by analyzing the financial activity of a subscriber to assign expenses/payments to various categories. See APPENDIX A of PCT Publication WO 2008/082794 A2. Significant deviations (e.g., greater than 20%, 30%, . . . 50%, or any suitable dollar amount) from typical expenses for a significant budget category may indicate that the subscriber is currently experiencing financial difficulty or unexpected expenses. For some subscribers, such unexpected expenses may cause the subscribers to curtail certain other purchases. By correlating such unexpected expenses to purchasing behavior, subscriber reaction to subsequent unexpected expenses may be predicted and ad selection modified in response thereto. Accordingly, such information can be obtained and stored in subscriber profiles according to some representative embodiments for the purpose of ad selection for subscribers.

Figure 20:
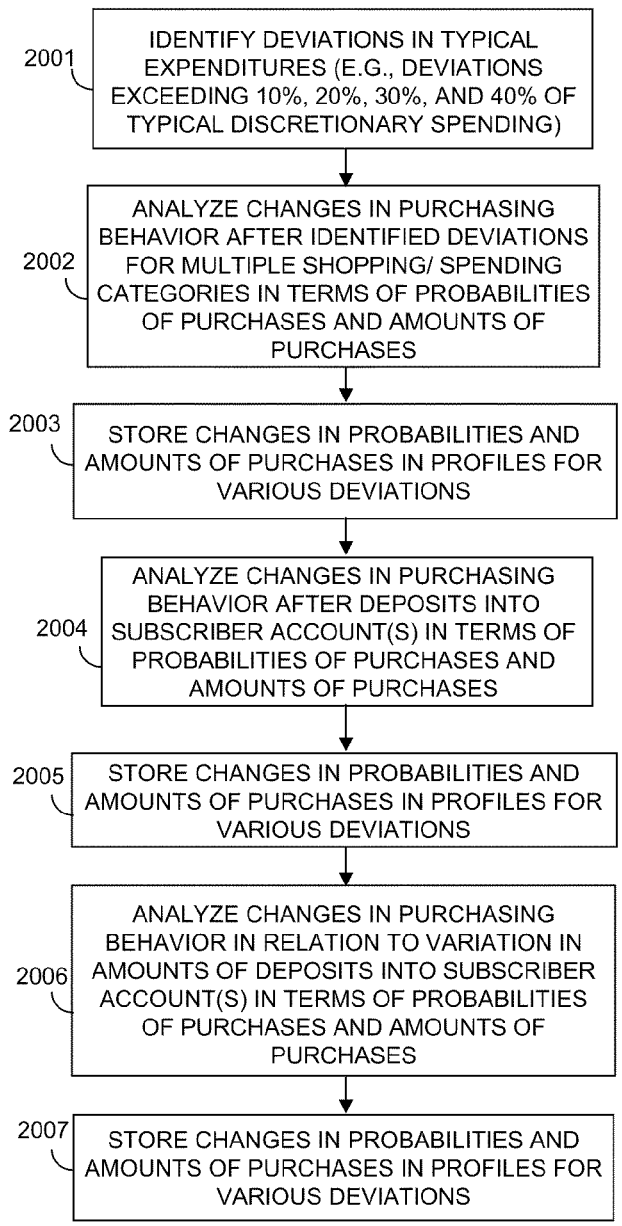
FIG. 20 depicts activity norm analysis that cross-correlates selected financial transaction behavior to other subscriber behavior.

FIG. 20 depicts activity norm analysis that cross-correlates selected financial transaction behavior to other subscriber behavior. In 2001, deviations in typical expenditures (e.g., deviations exceeding 10%, 20%, 30%, and 40% of typical discretionary or other spending) are identified. Such deviations may be performed to identify unexpected expenses or significant purchases that may impact other purchasing decisions of the subscriber. In 2002, changes in purchasing behavior after identified deviations are identified for multiple shopping/spending categories in terms of probabilities of purchases and amounts of purchases. In 2003, changes in probabilities and amounts of purchases are stored in profiles for the various identified deviations (if any). In 2004, changes in purchasing behavior after deposits into subscriber account(s) in terms of probabilities of purchases and amounts of purchases are analyzed In 2005, changes in probabilities and amounts of purchases are stored in profiles for various deviations. In 2006, changes in purchasing behavior in relation to variation in amounts of deposits into subscriber account(s) in terms of probabilities of purchases and amounts of purchases are analyzed. In 2007, changes in probabilities and amounts of purchases are stored in profiles for various deviations.

Figure 21:
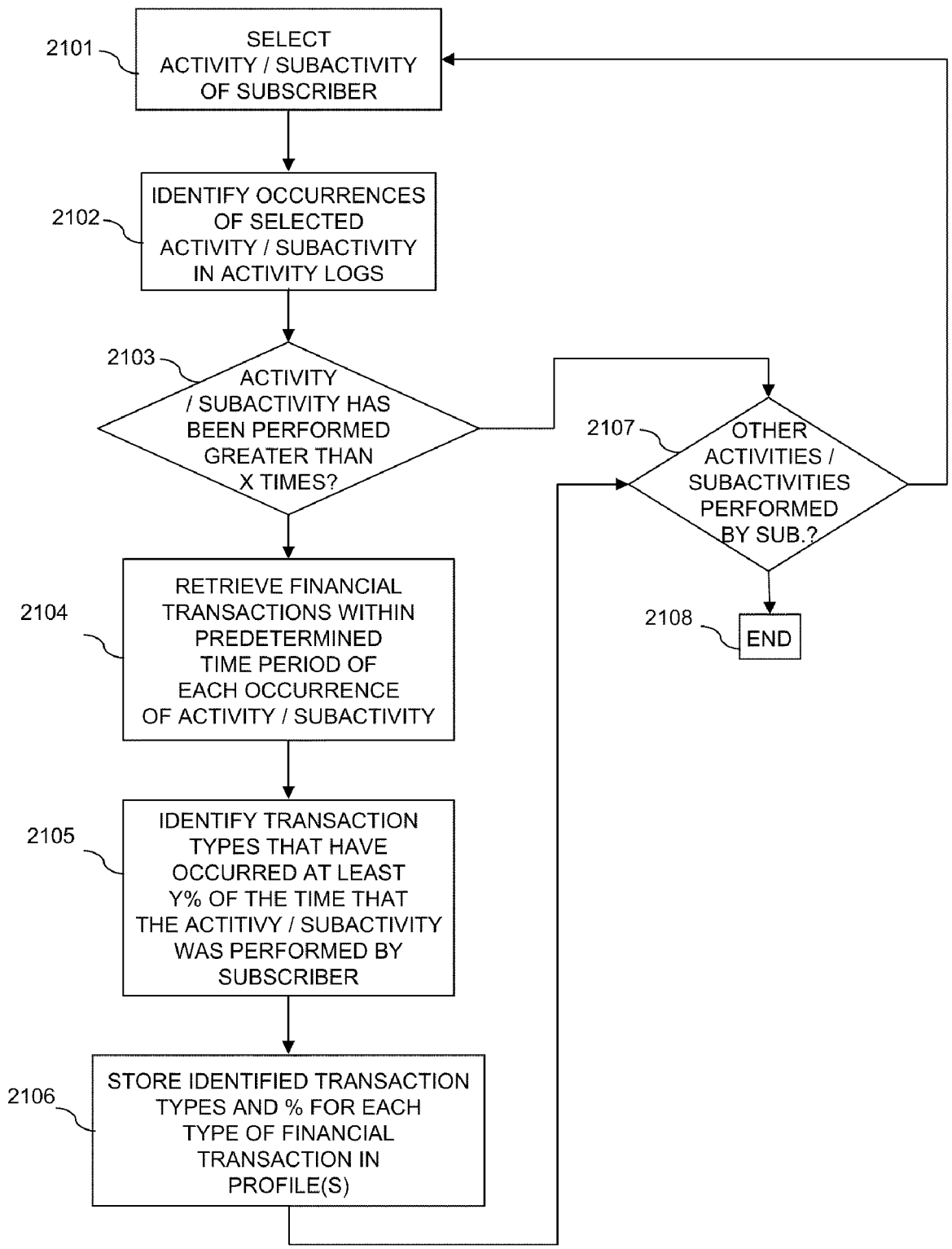
FIG. 21 depicts activity norm analysis that cross-correlates selected activities and/or sub-activities to financial transactions according to one representative embodiment.

FIG. 21 depicts a flowchart to identify correlations between purchasing behavior of a subscriber and various activities performed by the subscriber according to one representative embodiment. In 2101, an activity and/or subactivity of subscriber is selected for analysis. In 2102, occurrences of selected activity/subactivity in activity logs for a suitable time period (e.g., six months) are identified. In 2103, a logical comparison is made to determine whether the selected activity/subactivity has been performed greater than x number of times within the period of time. If so, the process flow proceeds to 2104. If not, the process flow proceeds to 2107.

In 2104, financial transactions within predetermined time period of each occurrence of activity/subactivity are retrieved (e.g., within one, two, or three hours, for example). In 2105, transaction types that have occurred at least y % of the time that the activity/subactivity was performed by subscriber are identified (e.g., clothing purchases, payments for dining, payments for various forms of entertainment, etc.). A suitable percentage of the time may be 50% according to one embodiment (although any other suitable percentage could be employed for other embodiments). In 2106, identified transaction types and % for each type of financial transaction are stored in one or more profile(s).

In 2107, a logical comparison is made to determine whether other activities/subactivities have been performed by the subscriber within the last six months or other selected time period. If so, the process flow returns to 2101 for selection of another activity/subactivity. If not, the process flow ends at 2108.

In some embodiments, the information stored in DB 107 is utilized to analyze and detect the collective activities of subscribers. In some embodiments, "clustering" of subscriber activity is detected. As used in this application, clustering refers to multiple subscribers engaging in a common activity or activities within the relatively same geographical location. Clustering of such individuals could be detected over time by repeatedly observing the close proximity in the locations of such individuals. That is, because the same subscribers are observed in very close physical proximity on multiple occasions, some type of relationship is believed to exist between such subscribers. Specifically, their repeated presence together is not a mere accident. Alternatively, the relationship between such subscribers could be known using a priori information (e.g., as provided by one or several of the subscribers when opening an account with some web or other application, as defined by a social networking application, etc.). It shall be appreciated that clustering is not limited to any particular type of relationship. Clustering may occur in many contexts, e.g., family activities, gatherings of friends, business meetings, etc.

Clustering provides valuable insight into the expected behavior of subscribers and especially commercial behavior. Thus, the detection of clustering provides a valuable mechanism to direct various types of advertising to such subscribers. The advertising may take the form of direct ads sent to wireless devices of the subscribers, e-mail advertisements, web page advertisements, etc. The communication of ads may occur while the clustering is taking place or may occur at a later time. The communication may occur before the clustering takes place. That is, it may be possible to predict a clustering event (e.g., the specific subscribers have been observed to cluster at the same approximate time/day, etc.) based on prior subscriber behavior. In such a case, delivery of the ads may occur immediately before the estimated time of the predicted clustering event as an example.

As an example, a family may decide to go to a mall on a weekend day. It is quite common for multiple members of the family to possess their own cellular phones. Perhaps, each parent and each teenager in the family would possess their own cellular phone or other wireless device. Assuming that each family members' wireless device possesses a suitable LBS application that reports the respective subscriber's location to an LBS application or LBS gateway, the clustering of the family members can be detected. For example, when the family members initially enter the mall, the family members' respective GPS data may be very similar. That is, the LBS applications of their wireless devices may report substantially similar location information. Also, as each family member enters the mall, the GPS reception may fade at substantially the same time (which can be communicated to an LBS application or gateway). Using such close GPS or other location information, their very close proximity to each other can be detected thereby indicating that a clustering event is occurring. Each member of the family may not necessarily be within very close proximity for the entire expedition to the mall. However, during the common activity, the activities of the family members will most likely be inter-dependent in many ways even though the members are not necessarily in very close proximity the entire time.

For example, the family members may initially separate to frequent each family member's favorite stores. However, the family members may gather back together to eat lunch or dinner together. Also, the purchases of the family members may be quite different when the family members are together as opposed to when the family members go shopping individually. For example, when a family is found to be clustering, purchasing may be skewed towards the children or teenagers of the family. If the parents are found to cluster without the children, a different set of purchasing behavior could be expected. Likewise, if each individual were determined to be shopping alone, the purchasing behavior again may be different. Further, shopping in the context of peers or friends can exhibit another set of purchasing norms. Additionally, the individual making the purchases may be different depending upon the presence of other individuals. For example, a parent may decide to go to a particular establishment for a meal for the family which would not be chosen by any individual on their own. Hence, in such a situation, the type of ads for meals should depend upon whether the clustering is taking place and the members of the current cluster. Also, it would be beneficial to identify the party that is most likely to make the purchasing decision.

Figure 3:
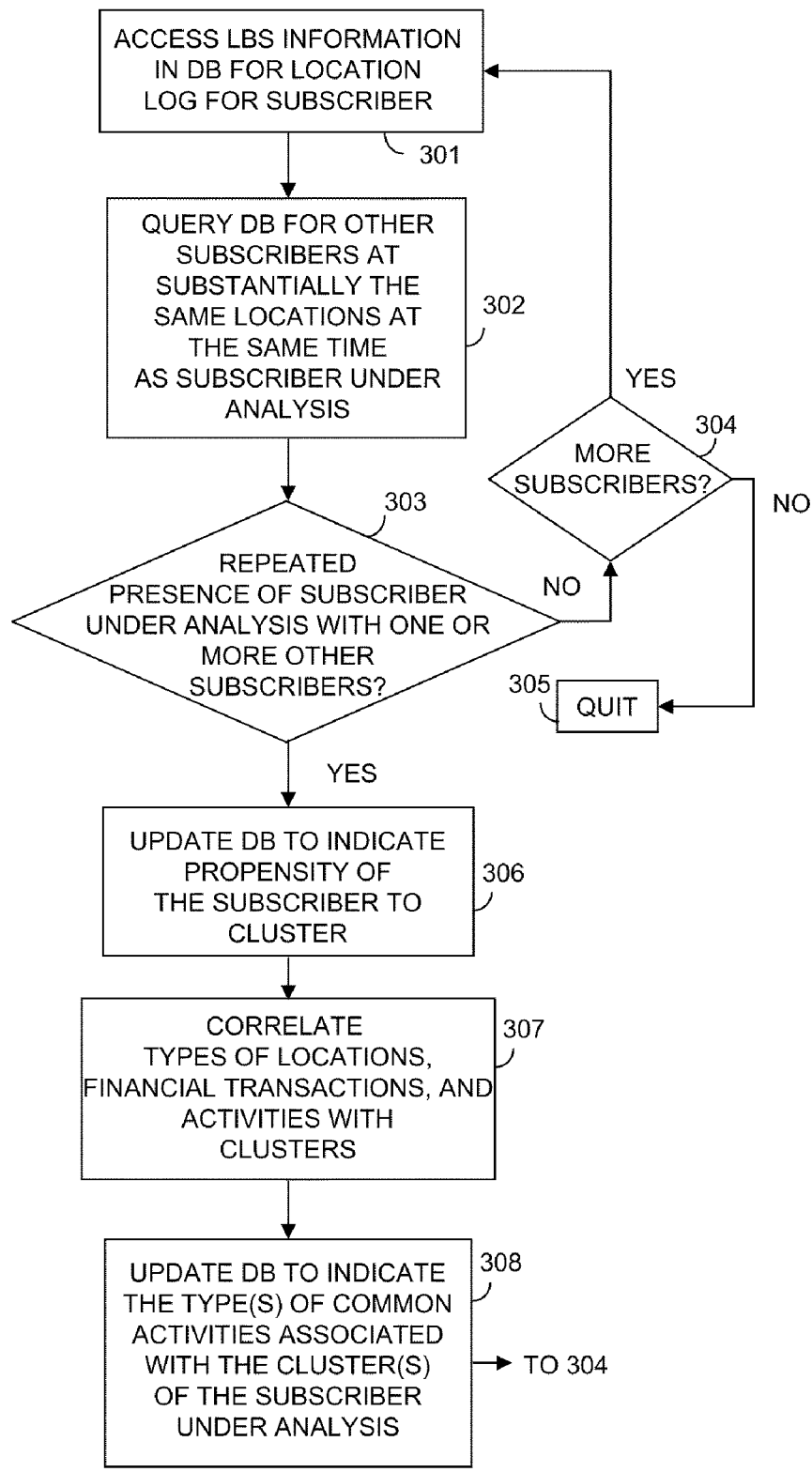
FIG. 3 depicts a flowchart for identifying clustering according to one representative embodiment.

FIG. 3 depicts a flowchart according to one representative embodiment. In step 301, LBS information is accessed from one or several databases for prior locations of a selected subscriber as logged in the database(s). In step 302, the database(s) is/are queried for other subscribers that were present at substantially the same location as the selected subscriber at substantially the same time. In step 303, a logical comparison is made to determine whether there are one or more subscribers that were repeatedly present at the same location as the selected subscriber.

If not, the selected subscriber has not been observed to exhibit clustering behavior and the process flow proceeds to step 304 where another logical determination is made. In step 304, it is determined whether there are additional subscribers to analyze. If not, the process flow proceeds to step 305 to quit. If there are, the process flow returns to step 301 to select another subscriber.

If the logical comparison of step 303 determines that there are one or more subscribers that were repeatedly present at the same location as the selected subscriber, the process flow proceeds from step 303 to step 306. In step 306, a suitable database update is completed to indicate that the selected subscriber exhibits clustering activity. The database update may include indicating the identifiers of other subscribers with which the subscriber tends to cluster.

In step 307, the activities, associated financial transactions, etc. associated with the common locations are identified for the selected subscriber are identified. In step 308, one or more databases are updated to indicate the type(s) of locations, type(s) of common activities and transaction data associated with the selected subscriber's clusters. The process flow proceeds from step 308 to step 304 to determine whether there are additional subscribers for the cluster analysis process.

Figure 4:
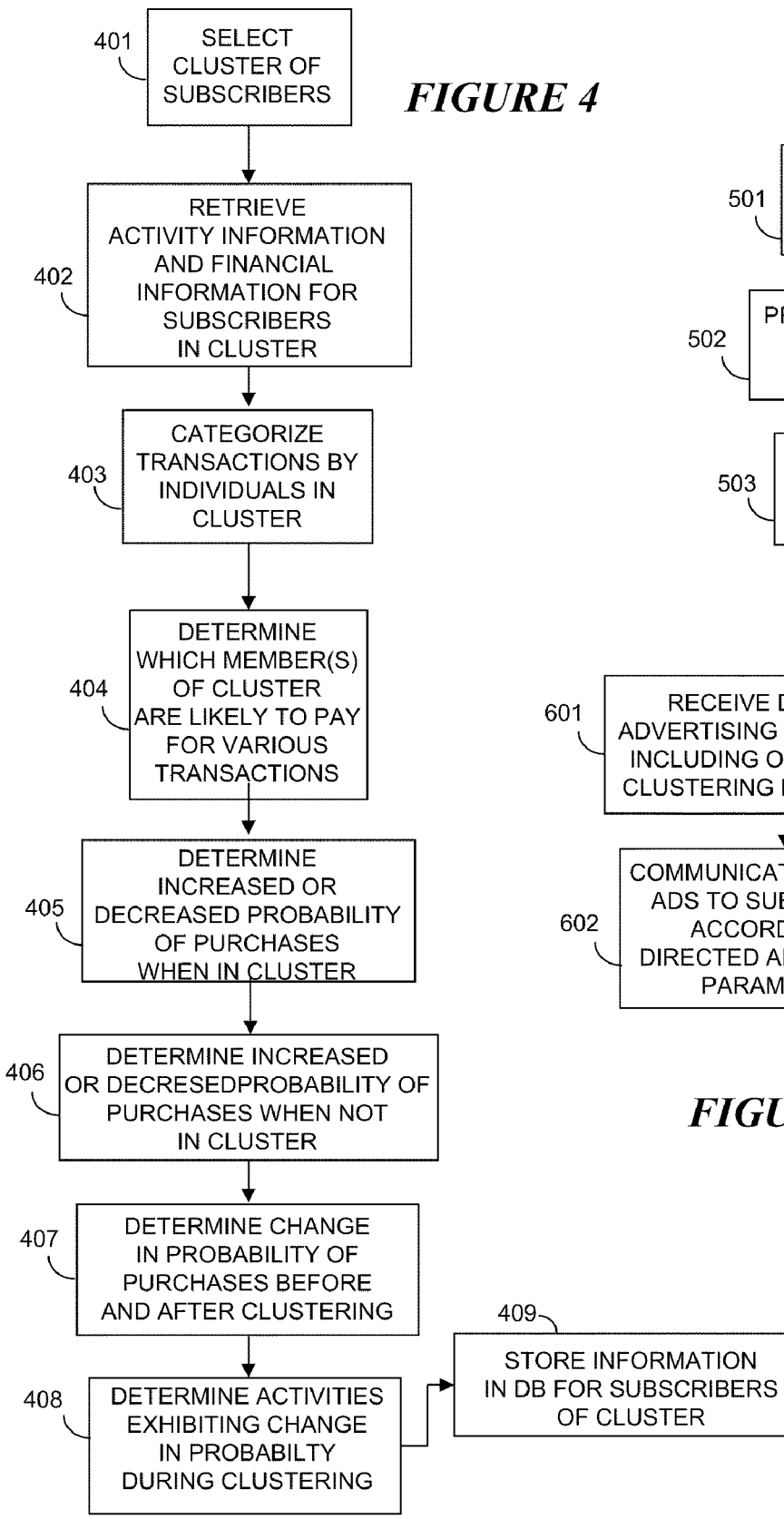
FIG. 4 depicts a flowchart for processing cluster data according to one representative embodiment.

FIG. 4 depicts a flowchart for processing cluster data according to one representative embodiment. In step 401, a cluster of subscribers (multiple subscribers that have been repeated observed within close proximity of each other) is selected (e.g., as identified in one or more databases). In step 402, activity information and financial information (e.g., transaction details) for subscribers in the cluster are retrieved.

In step 403, the transactions by individuals in the cluster are categorized (if not already so processed). In step 404, the member(s) of the cluster that are likely to pay for various transactions during clustering are determined. In step 405, the types of goods and/or services that exhibit an increased or decreased probability of purchase are determined for the subscribers of the cluster. In step 406, the types of goods and/or services that exhibit a change in probability when the individuals are not clustering are identified. In step 407, the types of goods that exhibit a change in probability before and after clustering are determined for the subscribers of the cluster. In step 408, the activities that exhibit a change in probability (increase or decrease) in conjunction with the clustering are identified.

In step 409, the information pertaining to the clustering is stored in a suitable database or databases.

Figure 5:
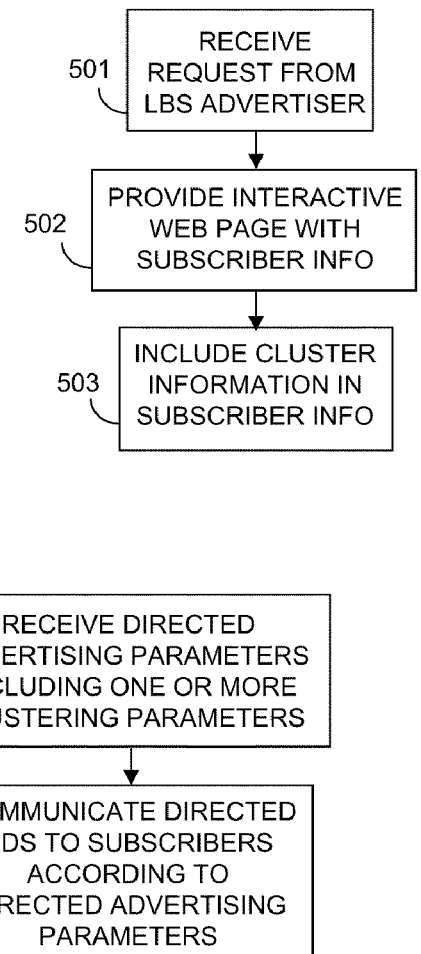
FIG. 5 depicts a flowchart for utilizing cluster information according to one representative embodiment.

FIG. 5 depicts a flowchart for utilizing cluster information according to one representative embodiment. In step 501, a request (e.g., an HTTP transaction to a suitable LBS advertising web server application) is received from an LBS advertiser.

In step 502, a suitable web page is provided to the LBS advertiser that preferably includes interactive elements to enable the LBS advertiser to view subscriber information and to direct advertisements to suitable subscribers. In step 503, cluster information is included within the subscriber information for provision to the LBS advertiser. For example, the LBS subscriber may be allowed to click on a graphical element within the web page that represents a given subscriber. In response, subscriber information may be presented (e.g., an activity log, transaction information, activity norms, financial transaction norms, etc.). Within such information, preferably the LBS advertiser is provided information that indicates whether the subscriber is current "clustering" and, if so, with which other subscribers. The nature of the clustering is preferably identified (e.g., family clustering, peer clustering, business clustering, etc.). Also, information that identifies the types of transactions or activities that exhibit increased or decreased probability are preferably provided. By providing such information, the LBS advertiser can more effectively identify desirable subscribers for ads and/or selected more appropriate ads for the subscribers.

Figure 6:
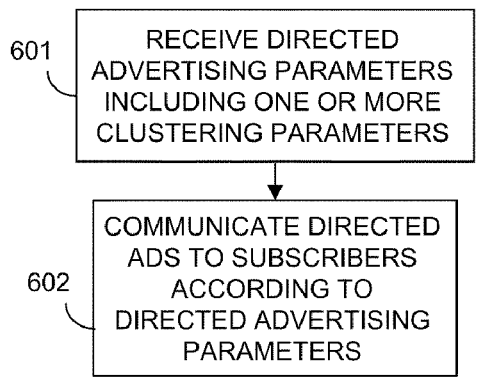
FIG. 6 depicts a flowchart for utilizing cluster information according to another representative embodiment.

FIG. 6 depicts another flowchart for utilizing cluster information according to one representative embodiment. In step 601, advertising parameters are received (which may include one or more clustering parameter values). The advertising parameters define the desired recipients of one or more directed advertisements (e.g., as will be delivered to subscriber wireless devices). For example, the following tag-encoded parameters could be used as part of a desired LBS advertising effort to direct advertisements to subscribers: {<LOCATION>STONEBRIAR MALL</LOCATION> AND <CLUSTERING> TRUE </CLUSTERING> AND (<CLUSTERINGWITHFAMILY> TRUE </CLUSTERINGWITHFAMILY} OR <CLUSTERINGWITHFRIENDS> TRUE </CLUSTERINGWITHFRIENDS>) AND (<CLUSTERINGPURCHASER> MEAL </CLUSTERINGPURCHASER>}. In this case, the ads would be directed to subscribers located within or proximate to "Stonebriar Mall." Also, the subscribers would be required to be clustering before the advertisement(s) associated with these parameters would be delivered. Also, the subscribers would be required to be clustering with family members or friends (as opposed to business purpose clustering). Also, each advertising target would be required by these parameters to be a subscriber within the respective cluster that tends to pay for meals during the clustering of the respective subscribers.

In step 602, ads are communicated by a suitable LBS advertising platform to subscribers according to the received parameters. The direction of the ads may directly depend upon the defined clustering parameters/data provided in the received parameters. For example, an advertiser may direct that advertisements are only to be sent to members of a cluster that make purchasing decisions for meals among other advertising parameters in addition to providing non-clustering advertising parameters. The ad parameters may be defined in terms of any of the clustering information discussed herein or any other suitable clustering information. Alternatively, the advertiser may provide more general advertising parameters and automated subscriber selection algorithms can select the most probable subscribers to respond based upon the clustering information.

Social network applications commonly refer to applications that facilitate interaction of individuals through various websites or other Internet-based distribution of content. Originally, the concept of a social network originated within the field of sociology as method of modeling social interactions or relationships. Within such modeling, individuals, groups, or organizations are represented as nodes within a social network and the relationships between the "nodes" are represented as links between the nodes thereby forming a "network."

Some known social network applications have (directly or indirectly) utilized such concepts to facilitate interaction between individuals via the Internet. In most social network applications, a specific user can create an account and provide various types of content specific to the individual, such as pictures of the individual, their friends, their family, etc., personal information in text form, favorite music or videos, etc. The content is then made available to other users of the social network application. For example, one or more web pages may be defined for each user of the social network application that can be viewed by other users of the social network application. Also, social network applications typically allow a user to define a set of "friends," "contacts," or "members" with whom the respective user wishes to repeatedly communicate. Users of a social network application may post comments or other content to portions of each other's web pages.

For the purpose of this application, a social network application refers to any application or system (with communication over wired and/or wireless networks) in which users are permitted to create or define accounts in which the users can make personalized information and content available for viewing by other users of the social network application and, in which, users can define, allow, or create contacts or friends within the social network application in which repeated interaction is intended to occur through the social network application. As used herein, an "account" of a social network application refers to the collection of data maintained for a respective user for interaction with the social network application and other users of the social network application whether stored together or separately. The collection of data may include user id, password, screen name, email address, wireless device info., name information, demographic information, likes/dislikes, photos, activities, relationships, etc.

Some representative embodiments differ from certain previously known social network applications. Some representative embodiments preferably provide functionality that enables users of a social network application to interact with other users or "friends" in unique ways. In some embodiments, users may interact with a mobile or mobile application on a smartphone of the user to indicate their "current place" for communication to other users or friends. Also, users may leave comments for other users for such places for presentation to their friends and users (e.g., via their smartphones). As used herein, the term "mobile application" refers to an application on a mobile or wireless, subscriber device which conducts network communication using the wireless functionality of the subscriber device. Some representative embodiments further provide functionality in a wireless phone to enable a user to upload data and/or images to the account of the user in an efficient manner for presentation to other users.

Some representative embodiments further enable users to indicate items to which the users have affinity or "like" via a "like function." In yet further embodiments, the social network application includes location based service functionality as discussed herein. For example, activities of users of the social network application may be logged and employed to direct ads to users of the social network application (e.g., via a mobile application or other software on a given user's smartphone).

Figure 22:
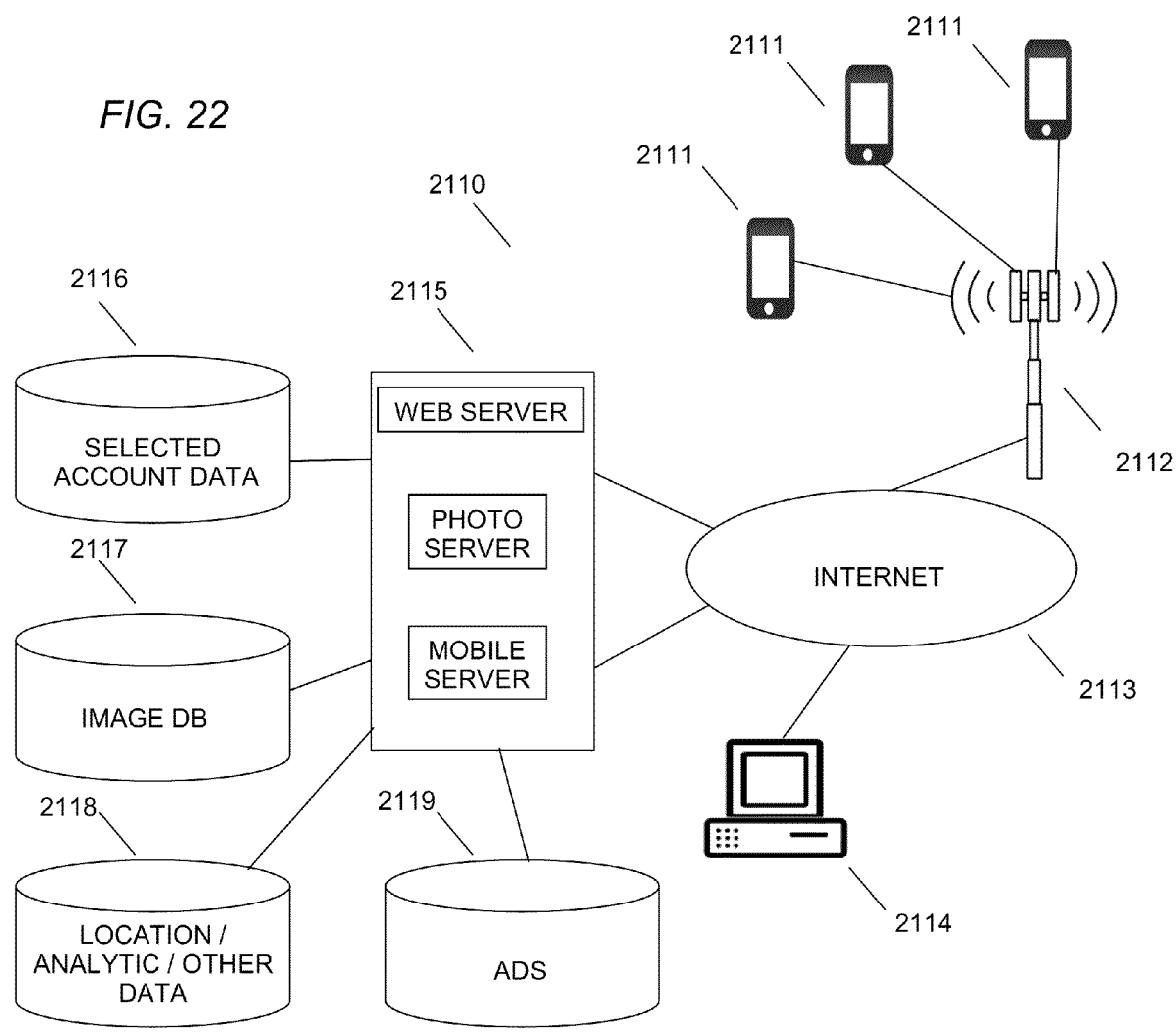
FIG. 22 depicts a system for supporting a social network application according to one representative embodiment.

Referring to system 2110 as shown FIG. 22, some embodiments may conduct various social network application operations. Such operations may include operating at least one social network application server 2115 for interacting with users of the social network application. The software on server(s) 2115 may include a web server for serving pages of the social network application, e.g., HTML pages via HTTP protocols via Internet 2113. Users on computers 2114 may access their accounts, uploaded data, communicate with friends, view other user web pages on the social network application, etc.

In one embodiment, photo server is provided for direct uploading of photos to the social network application. Also, a mobile server may be provided for facilitating interaction with wireless, telephony subscriber devices 2111. The software on the application server may maintain selected user account data (in database or other data store 2116) for users of the social network application, where the user accounts include data defining relationships between users of the social network application. The relationships may be referred to as "friends" providing a link between respective users of the social network application. Such friends or users may have privileged status to view certain content posted to the account of another user. The content may include photos (e.g., as stored in image DB 2117).

Preferably, at least some of the users of the social network application are users of wireless, telephony subscriber devices 2111 (which communicate, at least partially, through wireless infrastructure 2112 of a public, telephony network). Devices 2111 may also include other wireless communication functionality (e.g., Wi-Fi or similar wireless functionality). The social network application may provide software to operate on wireless, telephony subscriber devices. The software may be in the form of browser-executable code or may be an application for installation and execution on the wireless, telephony subscriber device.

Figure 23:
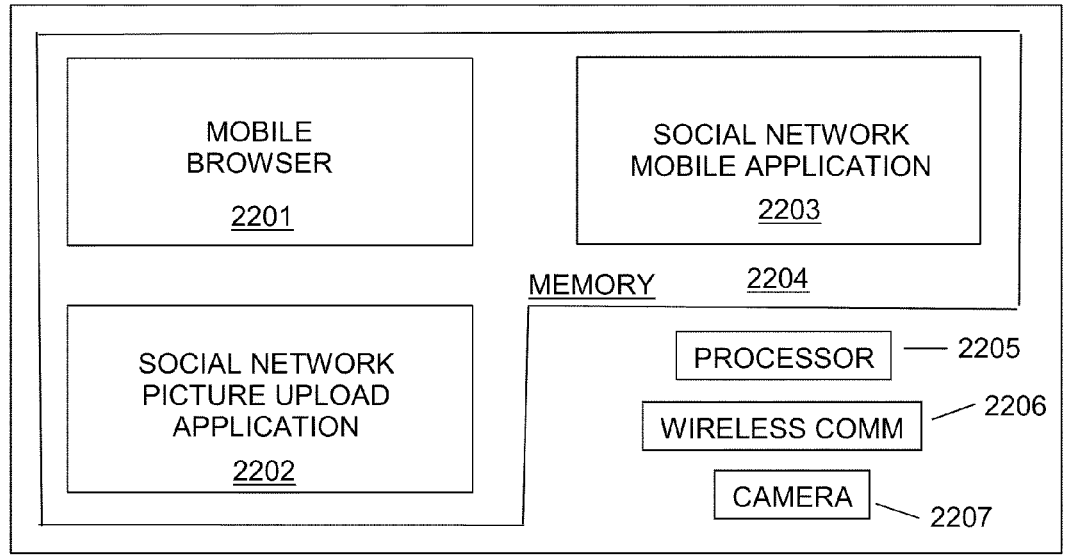
FIG. 23 depicts a wireless, telephony subscriber device according to one representative embodiment.

FIG. 23 depicts telephony device 2111 according to one representative embodiment. Device 2111 may include conventional components such as processor 2205, wireless communication circuitry 2206, camera 2207, etc. Device 2111 may include memory 2204 for storing data and software. The software may include mobile browser 2201, social network mobile application 2203, and social network application picture upload application 2202 according to some embodiments. Any other suitable software may be included including software for communicating location data and/or device use data and software for receiving ads.

In some embodiments, a "like-function" is provided by the social network application. The like-function is a function whereby a user of the social network application may input data, which is defined within the social network application and commonly understood by the users of the social network application, to indicate approval of or affinity with a defined item. That is, the user may input data via a user interface (e.g., on a smartphone app or via a web page on a smartphone or computer) to indicate such approval or affinity and the data is stored in the account of the user. The inputted data from the like-function may then be shared with friends of the given user or other users. The communication of "like-function" data to friends may be communicated to friends based upon access control limits (e.g., all social network users, friends only, selected friends only, etc.).

The like-function may be implemented in any suitable form. For example, a simple boolean graphical user input (e.g., a radio button, a select button, etc.) may be provided for the user to indicate the user's affinity or approval. Alternatively, more complex user interface element may be additionally or alternatively employed, e.g., a text input box for specific comments. For commercial items, the like-function data may be indicative of an item that the user is currently contemplating buying, the types of stores that the user is willing to purchase from, the price range of products that the user contemplates is appropriate for the goods of interest, etc. Any such suitable like-function data may be gathered in accordance with some embodiments.

In some embodiments, the like-function is combined with location data (e.g., as obtained by the smartphone of the respective user) to specify the location of the item identified by the user via the like-function. The like-function data may also be communicated in a location dependent manner, e.g., when selected friends are present at or arrive at a location near or proximate to the location where the originating user identified the item of interest.

Also, ads (e.g., as stored in ad DB 2119) may be selected based upon items identified via the like-function and any other social network application data discussed herein. The ads may also be communicated in a location dependent manner. Any of selection algorithms discussed herein may be employed for direction of ads to users of the social network application according to ad selection criteria for comparison against location, analytic, and/or other data as stored in DB 2118 as an example. Any suitable ad selection and distribution infrastructure may be employed. For example, the multiple application infrastructure discussed herein may also be employed according to some embodiments.

Figure 25:
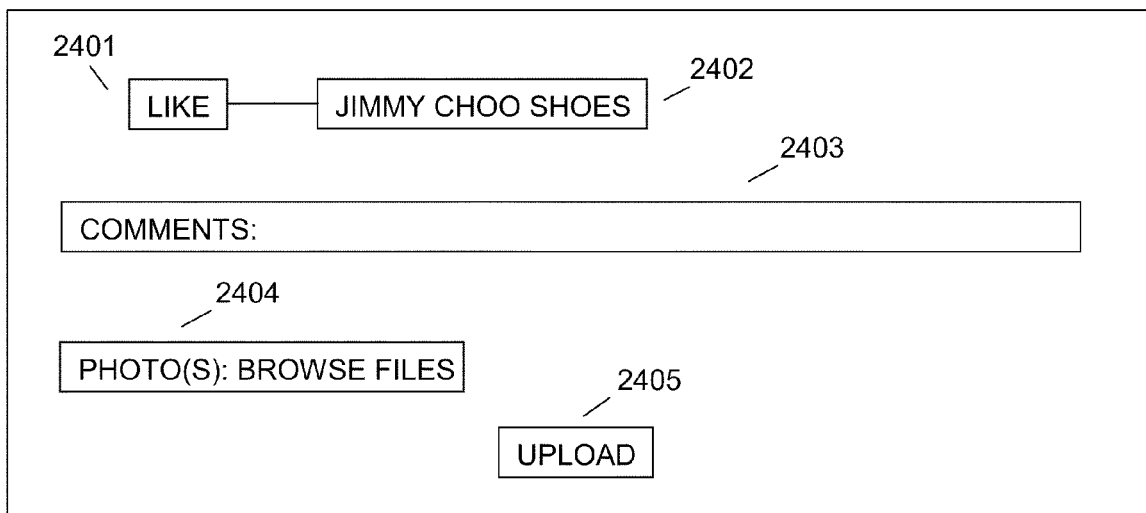
FIG. 25 depicts a user interface for use in a social network application according to one representative embodiment.

FIG. 25 depicts a user interface that may be provided by suitable software on a wireless device 2111 (e.g., by mobile browser 2201 when it is executing suitable browser executable code or application 2203). The interface includes a button for the user to select to indicate affinity or approval of the defined item 2402. The defined item may be input directly by the user via text entry. Alternatively, the defined item may be pre-defined for selection by the user. The user may input appropriate comments in text control 2403. In other embodiments, the user may also upload photos using control 2404. Control 2404 enables the user to browse files and file directories for selection of one or more photos for the upload process. Button control 2405 enables the user to upload the photo(s) and data defined by the various controls.

In some embodiments, the social network application includes functionality to enable interaction and/or communication between users of the social network application in relation to defined locations or "places." In some embodiments, mobile app software is provided (e.g., via downloading and/or installation) for operation on the wireless, telephony subscriber devices. The mobile app software is intended for interacting with the social network application to access user accounts of the social network application. For example, the mobile app software may enable a user to view the profile pages of the friends of the user and the profile pages of other users (as permitted by access control data).

The mobile app software is preferably further adapted to enable a user of the wireless, telephony subscriber device to "check in" at respective locations from a plurality of locations. A "check in" refers to an operation that is performed via the social network application (e.g., through the mobile app software) to permit the user to indicate through the social network application the current whereabouts of the user. This location may be displayed on the user's profile page, be communicated on a map interface provided by the social network application, or may be communicated directly to the wireless, telephony subscriber devices of friends. The communication may occur in substantially real-time as the performance of the check-in operation in certain embodiments.

In some embodiments, the check-in operation may identify a location from a plurality of locations that are defined in the social network application and, preferably, includes places of business. The plurality of locations may include user defined locations as directly input via the software on subscriber devices.

In some embodiments, the mobile app software provides selections for the user to control visibility of the user's current location (and/or related content) to other users of the social network including friends of the user and customizable lesser subsets of all friends of the user. The user may select specific friends from a list to permit (or prohibit) viewing of the user's current location and location-content. Pre-defined groups or lists of friends may be defined for selection for this purpose.

In some embodiments, the mobile app software provides input capabilities to receive one or more comments to be automatically posted to the account of the user, the one or more comments being specifically tied to respective locations identified by functionality of the wireless, telephony subscriber device such that friends of the user as selectively permitted by the user are able to view the one or more comments of the user on a map interface at the respective identified locations in substantially real-time as the user who posted the one or more comments is at the respective location.

In some embodiments, the number of check-ins are counted for specific merchants for users of the social network application. Incentive offers are then communicated depending upon the specific number of check-in operations performed by respective users. In this manner, users of the social network may be rewarded for loyalty to specific merchants and for participating in the check-in functionality of the social network application.

Also as discussed herein in regard to operations of apps and wireless, telephony subscriber devices, activities of users of the wireless, telephony subscriber devices are preferably logged (e.g., as stored in DB 2118 and/or DB 2116 in FIG. 22) where the logged activities include device use, app use, and even real-world activities as discussed herein. These activities may be inferred from location data and/or device use data. Alternatively, an individual user may explicitly input data to indicate the current activity of the user. The activities may be presented for review by other users and/or may also be employed to select advertisements for users of the social network application.

Figure 24:
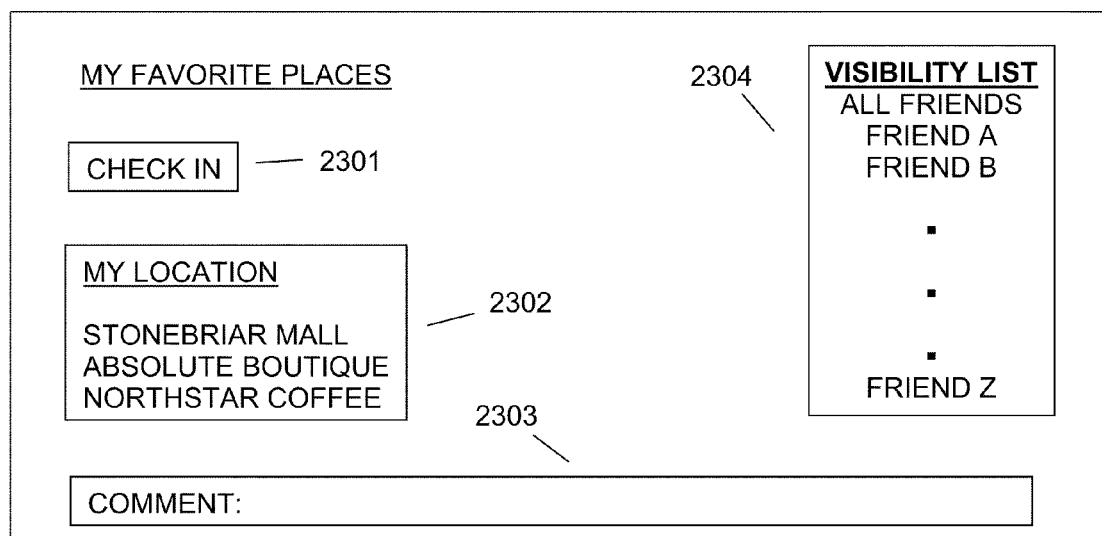
FIG. 24 depicts a user interface for use in a social network application according to one representative embodiment.

FIG. 24 depicts a user interface that may be provided by suitable software on a wireless device 2111 (e.g., by mobile browser 2201 when it is executing suitable browser executable code or application 2203). The interface includes "check in" button, that when selected, causes the software to communicate a suitable message to the social network application that identifies the current location of the user for use by the social network application. The location may be determined automatically using GPS functionality or other wireless location algorithms. Additionally or alternatively, the user may select a location from list 2302. Additionally or alternatively, the user may define a location via interface for the check in operation. The user may also enter a comment via text control 2303 to be display with the user's current location on the social network application. The visibility of the current location may be controlled using visibility list 2304 to select all users, all friends, a lesser subset of friends (e.g., a number of friends less than the full group of friends), or no visibility at all as desired by the user.

In some embodiments, the social network application is adapted to facilitate substantially real-time posting of photos to accounts (e.g., for display via profile pages) taken directly from wireless, telephony subscriber devices of users of the social network application.

In some embodiments, first mobile app software for operation on the wireless, telephony subscriber devices is provided for interacting with the social network application to access user accounts of the social network application. The first mobile app software may be browser executable code (e.g., an HTML variant) or a mobile application. Second mobile app software (e.g., software 2202 in FIG. 23) for operation on the wireless, telephony subscriber devices is provided for posting photos taken by the wireless, telephony subscriber devices to user accounts of the social network application. The second mobile app software is adapted to directly interact with camera functionality of the wireless, telephony subscriber devices to transfer a captured photo to at least one social network application server (preferably with photo metadata, that is data entered via data input controls by the user of a respective wireless, telephony subscriber device).

The second mobile app software is preferably implemented to function without requiring the respective user to log into the social network application via the first mobile app software to view the user account of the respective user. That is, the user can simply take a picture using the camera functionality of the wireless, telephony subscriber device and then post or transfer the photo to the user's account without requiring the user to interact with the social network application through the conventional user account mechanisms (including navigating to the user's login page, initial web page, selection of a photo tab from the initial web page, etc.).

On the server side of the social network application, messages from the second mobile app software are automatically parsed and the photos are automatically posted to users accounts with data entered by the respective users as parsed from the messages (e.g., by photo server software of server platform(s) 2105). Preferably (but not required), the automatically parsing and automatically posting occurs through separate server functionality than provided for web page access of user accounts of the social network application. The photos and messages become available for viewing on the social network application web pages of the respective users in substantially real-time.

Figure 26:
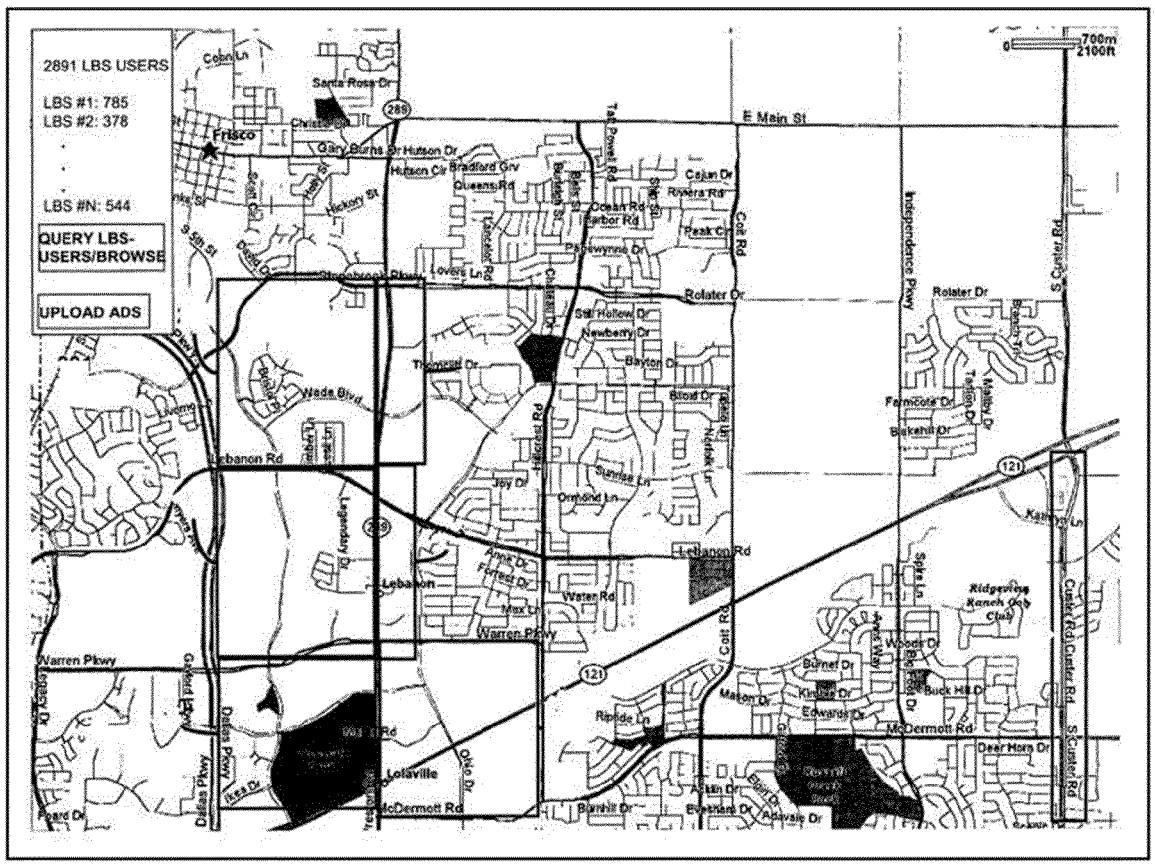
FIG. 26 depicts a map interface for displaying mobile subscriber analytics according to one representative embodiment.

In some embodiments, maps or map applications are provided in which wireless, telephony subscriber device data is presented over a map of a geographical region (see, e.g., map interface 2600 in FIG. 26). The device data may include subscriber analytic data. Alternatively, the data may include specific subscriber information. The logged activities (current and past activities) of subscribers may be presented on the maps. Also, in some embodiments, subscribers are able to identify specific areas that are excluded from data gathering according to subscriber privacy preferences.

In some embodiments, wireless device use data is received from multiple wireless, telephony subscriber devices by the at least one mobile device analytic server. The received wireless device use data is processed to generate subscriber analytic data and other data. Web queries are received from third-parties (e.g., other subscribers, advertisers, or other users). Web pages or web applications are communicated in response to the received web queries according to an internet protocol to the third-parties, including visual presentation of selected data items.

In some embodiments, each communicated web page or web application includes a display of a map of a respective geographical region and summary indications of wireless, telephony subscriber devices within the respective geographical region that are currently in use. The maps may further display the summary indications for subscribers that match subscriber or device criteria specified in the corresponding web query. Also, the web page or applications may display summary analytic data specific for different mobile applications employed on multiple, wireless telephony subscriber devices or display specific summary analytic data for different types or groups of mobile applications employed on multiple, wireless telephony subscriber devices. For example, all subscribers currently employing "gaming" applications or "social network" applications may be displayed on the map depending upon the specific supplied criteria. Trending analytics may be employed (e.g., current activity or recent activity data compared to longer-term typical or average analytic behavioral values).

When implemented in software, the various elements or components of representative embodiments are the code or software segments adapted to perform the respective tasks. The program or code segments can be stored in a machine readable medium, such as a processor readable medium, or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Although representative embodiments and advantages have been described in detail, it should be understood that various changes, substitutions and alterations can be made herein without departing from the spirit and scope of the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure that processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of conducting operations for a social network application, the method comprising:
   operating at least one social network application server for interacting with users of the social network application, wherein at least some of the users of the social network application are users of wireless, telephony subscriber devices;
   maintaining user accounts for users of the social network application, the user accounts including data defining relationships between users of the social network application;
   receiving update messages from users of the social network application from the wireless, telephone subscriber devices that include text information indicative of real-world activities of the respective users, wherein the text information is manually entered by the respective users;
   logging activities of users of the wireless, telephony subscriber device using, at least, the received update messages, the logged activities including real-world activities other than use of the wireless, telephony subscriber devices mobile application and use of the social network application;
   generating a notification list of recent activities of users of the social network application for presentation to other users of the social network application, wherein the notification list includes (1) at least one real-world activity of a first user logged within the social network application and (2) at least one hyperlink to an offer involving an activity that is directly related to at least one real-world activity of the first user, wherein an account of the first user defines at least one notification rule for controlling visibility of the at least one real-world activity to other users of the social network application; and
   providing the notification list to a second user, that is a friend of the first user within the social network application, according to the at least one notification rule of the first user, wherein the offer originates from a third-party different from the social network application, the first user, and the second user;
   (i) receiving location information over a period of time by one or more software programs from a plurality of wireless devices belonging to a plurality of subscribers;
   (ii) processing the location information to detect that respective subscribers tend to spend time at one or more locations with one or more other specific subscribers;
   (iii) storing data indicative of a tendency of each such subscriber to spend time with the subscriber's one or more other specific subscribers;
   (iv) detecting whether subscribers are present at locations with one or more specific subscribers identified in the stored data subsequent to performance of (ii) and (iii); and
   (v) comparing ad parameters against subscriber data, to select ads for communication to subscribers, wherein the comparing differentiates in selection of ads for communication to subscribers in response to (iv).

* * * * *